US012778343B2

(12) United States Patent
Chu

(10) Patent No.: US 12,778,343 B2
(45) Date of Patent: Nov. 3, 2026

(54) TIMER WITH FLARE FITTINGS AND TACTILE DIAL

(71) Applicant: No Worriez International Corp., Tampa, FL (US)

(72) Inventor: Phil Chu, Tampa, FL (US)

(73) Assignee: No Worriez International Corp., Tampa, FL (US)

( * ) Notice: Subject to any disclaimer, the term of this patent is extended or adjusted under 35 U.S.C. 154(b) by 9 days.

(21) Appl. No.: 19/172,503

(22) Filed: Apr. 7, 2025

(65) Prior Publication Data

US 2025/0235047 A1 Jul. 24, 2025

Related U.S. Application Data

(63) Continuation-in-part of application No. 18/053,214, filed on Nov. 7, 2022, now Pat. No. 12,270,553, which is a continuation-in-part of application No. 17/467,676, filed on Sep. 7, 2021, now abandoned.

(51) Int. Cl.

| | |
|---|---|
| ***F24C 3/12*** | (2006.01) |
| ***A47J 36/32*** | (2006.01) |
| ***A47J 37/07*** | (2006.01) |
| ***F16K 31/48*** | (2006.01) |
| ***F16K 31/60*** | (2006.01) |

(52) U.S. Cl.

CPC ........... *A47J 37/0786* (2013.01); *A47J 36/32* (2013.01); *F16K 31/485* (2013.01); *F16K 31/60* (2013.01); *F24C 3/124* (2013.01)

(58) Field of Classification Search

CPC .... A47J 37/0786; A47J 37/0713; A47J 36/32; F16K 31/485; F16K 31/60; F16K 31/607; F16K 21/04; F24C 3/124; F24C 3/12; F24C 3/126; F24C 15/02; F24C 5/16; B25G 1/102

See application file for complete search history.

(56) References Cited

U.S. PATENT DOCUMENTS

| | | | | |
|---|---|---|---|---|
| 2,556,908 A * | 6/1951 | Engholdt | F16K 31/485 | 137/553 |
| 2,608,319 A * | 8/1952 | Petry | F17C 7/00 | 222/509 |
| 2,837,154 A * | 6/1958 | Harper | F16K 31/485 | 137/624.22 |
| 2,930,239 A * | 3/1960 | Mcdowell | F16K 31/485 | 74/3.52 |
| 3,126,459 A * | 3/1964 | Leeson | G04C 23/16 | 968/616 |
| 3,581,028 A * | 5/1971 | Valbona | G04F 3/06 | 200/38 R |
| 3,803,923 A * | 4/1974 | Hajny | G04F 3/027 | 968/813 |

(Continued)

*Primary Examiner* — Craig M Schneider
*Assistant Examiner* — Andrew J Rost
(74) *Attorney, Agent, or Firm* — Bochner PLLC; Andrew D. Bochner

(57) ABSTRACT

The disclosure relates to a control valve system for use with a gas grill, and more particularly to a fuel shut off device that is attached to the fuel supply to turn it off, if the integrated timing device is allowed to accrue time equal to the preset amount of time set. A multi-segment tactile dial enables a user to feel the dial and set the appropriate time increment without having to look at the dial.

11 Claims, 22 Drawing Sheets

(56) References Cited

U.S. PATENT DOCUMENTS

| | | | | | |
|---|---|---|---|---|---|
| 3,820,405 | A * | 6/1974 | Hong | G04F 3/025 | 137/624.22 |
| 4,690,170 | A * | 9/1987 | Tsai | F16K 31/48 | 137/460 |
| 4,823,838 | A * | 4/1989 | Ferlin | F16K 31/48 | 251/74 |
| 5,404,910 | A * | 4/1995 | Mongarli | F16K 31/48 | 251/74 |
| 5,628,242 | A * | 5/1997 | Higley | A47J 37/0713 | 126/41 R |
| 6,289,792 | B1 * | 9/2001 | Grando | F24C 3/126 | 126/41 R |
| 6,398,185 | B1 * | 6/2002 | Wang | G05D 7/0106 | 251/249 |
| 6,733,276 | B1 * | 5/2004 | Kopping | F23N 5/22 | 431/86 |
| 7,117,893 | B1 * | 10/2006 | Krupa | F16K 31/485 | 137/624.11 |
| 7,816,818 | B2 * | 10/2010 | Sellecchia | G05G 1/10 | 126/42 |
| D763,715 | S * | 8/2016 | Raehsler | D10/96 | |
| 12,085,187 | B1 * | 9/2024 | Lai | F16K 31/485 | |
| 2021/0222791 | A1 * | 7/2021 | Sopher | F16K 31/48 | |

* cited by examiner

TIMER WITH FLARE FITTINGS AND TACTILE DIAL

CROSS-REFERENCE TO RELATED APPLICATION

This application claims the benefit of U.S. patent application Ser. No. 18/053,214, filed on Nov. 7, 2022, titled TIMER WITH FLARE FITTINGS AND TACTILE DIAL and this application claims the benefit of U.S. patent application Ser. No. 17/467,676, filed on Sep. 7, 2021, titled TIMER WITH FLARE FITTINGS AND TACTILE DIAL which are hereby incorporated by reference herein in its entirety, for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

Trademarks used in the present disclosure, and the applicants, make no claim to any trademarks referenced.

BACKGROUND DISCLOSURE

1) Field of the Disclosure

The disclosure relates to the field of gas grills, and, more particularly to a fuel shut off device that is attached to the fuel supply to turn off the gas grill if the timing device is allowed to accrue time equal to the preset amount of time set.

2) Description of Related Art

Currently the state of the art includes a number of automated and non-automated devices which are commonly referred to as a control valve to turn off gas flow to a gas grill. However, none of these devices provide an easy to use, easy to install, intuitive and simple device.

In particular there is a need for an easy to install device which provides all the components needed for a user to install the control valve as part of a single kit and that the controls provide tactile feedback to the user so that the user can easily set the timing function of the control valve.

SUMMARY

The instant disclosure in one form is directed to an easy to use and install "control valve and timer device" which can be installed between a propane tank and a gas grill. The control valve and timer device comprises a control valve and timer. The timer which is part of the control valve and timer device is manually activated by the user who sets the desired time duration that the gas is allowed to flow to the grill. Once the control valve and timer device are turned on the time is set. The control valve timing device allows gas to flow and automatically shuts the gas flow off once the preselected time has passed. The expiration of the timer results in terminating gas flow unless the user increases the preselected time. So, if a gas grill is used and is always shut off prior to the expiration time set by the user no action will result, but if the gas grill is inadvertently left on, once the time on the timer has expired, the control valve will be closed. This device provides a safety feature that, when installed, provides the safety of knowing that the gas flow to the gas grill is shut off if inadvertently left on, saves fuel, and can help prevent a fire hazard if the grill is left unattended and the gas has been left on. This device further includes a bypass feature which may bypass the timer/safety feature and allow the gas to flow indefinitely.

Another aspect of the present disclosure is directed to a gas control dial for a gas control valve, the gas control dial comprising a first segment notch, a plurality of level indicating segment notches and a blank or bypass segment notch wherein the first segment notch, the plurality of level indicating segment notches and the blank or bypass segment notch are spaced along a circumference of the gas control dial. The first segment notch includes a first segment wall, forming three sides of the first segment notch, having an open side opposite the first segment wall and a first segment floor, the first segment floor having a first segment identifying mark on the first segment floor, the first segment identifying mark being the word OFF, wherein the first segment identifying mark is rotationally enabled to align with a timer indicator mark on the gas control valve. Each of the plurality of level indicating segment notches include a second segment wall, the second segment wall forming three sides of the second segment notch, the second segment notch having an open side opposite the second segment wall, the second segment notch having a second segment floor, the second segment floor having a second segment identifying mark on the second segment floor, wherein the second segment identifying mark is rotationally enabled to align with a timer indicator mark to indicate consecutive levels of gas allowed through the gas control valve. The bypass segment notch includes a bypass segment wall, forming three sides of the bypass segment notch, having an open side opposite the bypass segment wall and a bypass segment floor, the bypass segment floor having a bypass segment identifying mark on the bypass segment floor, the bypass segment having BYPASS as a bypass identifying mark and is rotationally enabled to align with a timer indicator mark on the gas control valve to indicate an unrestricted level of gas allowed through said gas control valve. The first segment wall may include a forward wall having a vertical face and the vertical face is sloped from 90 to 30 degrees with respect to the segment floor, a trailing wall having a sloping face the sloping face of the trailing wall is sloped from 25 degrees to 45 degrees with respect to the segment floor and a back wall having a sloping face the sloping face of the back wall is sloped from 10 degrees to 45 degrees with respect to the segment floor.

Another aspect of the present disclosure is directed to a kit for controlling a gas grill. The kit includes a valve body having a timer indicator mark, a timer attached to the valve body and a gas control dial attached to the timer. The kit includes a gas supply connecting flared output fitting, an output hose, a hose connector; and at least one wrench, preferably two wrenches.

Another aspect of the present disclosure is directed to gas control module for a controlling the flow of gas to a gas burner, the gas control module comprising a valve body having a timer indicator mark, a gas valve disposed in the valve body, the gas valve for controlling gas passing therethrough, a timer attached to the valve body and in communication with the gas valve, the timer for controlling the gas valve and a gas control dial. The gas control valve includes a first segment notch, a plurality of level indicating segment notches and a blank or bypass segment notch wherein the first segment notch, the plurality of level indicating segment notches and the blank or bypass segment notch are spaced along a circumference of the gas control dial. The first segment notch includes a first segment wall, forming three sides of the first segment notch, having an open side opposite the first segment wall and a first segment floor, the first segment floor having a first segment identifying mark on the first segment floor, the first segment identifying mark being the word OFF, wherein the first segment identifying mark is rotationally enabled to align with a timer indicator mark on the gas control valve. Each of the plurality of level indicating segment notches include a second segment wall, the second segment wall forming three sides of the second segment notch, the second segment notch having an open side opposite the second segment wall, the second segment notch having a second segment floor, the second segment floor having a second segment identifying mark on the second segment floor, wherein the second segment identifying mark is rotationally enabled to align with a timer indicator mark to indicate consecutive levels of gas allowed through the gas control valve. The bypass segment notch includes a bypass segment wall, forming three sides of the bypass segment notch, having an open side opposite the bypass segment wall and a bypass segment floor, the bypass segment floor having a bypass segment identifying mark on the bypass segment floor, the bypass segment having BYPASS as the bypass segment identifying mark and is rotationally enabled to align with a timer indicator mark on the gas control valve. The first segment wall may include a forward wall having a vertical face and the vertical face is sloped from 90 to 30 degrees with respect to the segment floor, a trailing wall having a sloping face the sloping face of the trailing wall is sloped from 25 degrees to 45 degrees with respect to the segment floor and a back wall having a sloping face the sloping face of the back wall is sloped from 10 degrees to 45 degrees with respect to the segment floor. The gas control dial allows a user to feel each of the dial first segment notch, the plurality of level indicating segment notches and the blank or bypass segment notch in order to set time increment in the timer without having to look at the dial.

An advantage of the present disclosure is the ability disclosure to provide an easy to install device by providing a kit which has all the components needed for a non-professional installer to connect the gas lines to the timer without the need for special tools or sealants. The instant disclosure is easy for customers to set up and convenient for users to select the desired time when the timer is not easily visible, such as when the control valve is used at night or when the control valve is installed under a gas grill.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

Corresponding reference characters indicate corresponding parts throughout the several views. The exemplifications set out herein illustrate embodiments of the disclosure and such exemplifications are not to be construed as limiting the scope of the disclosure in any manner.

DETAILED DESCRIPTION

Figure 1:
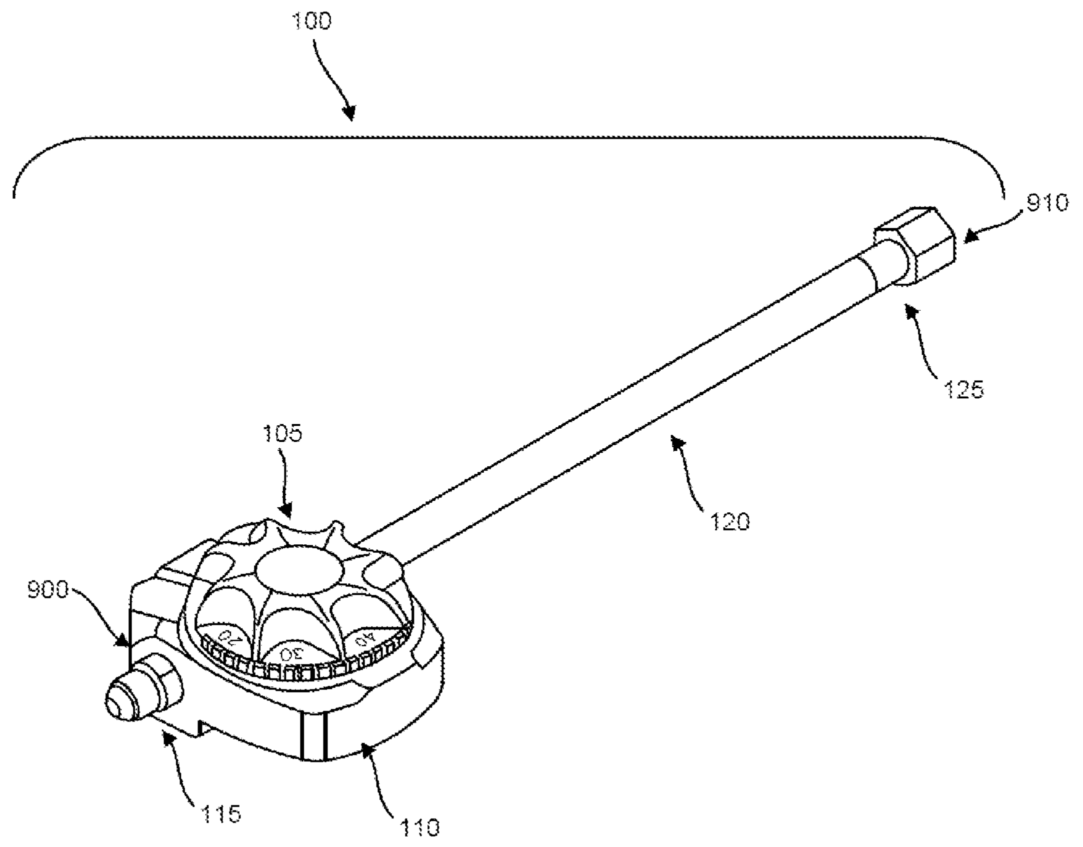
FIG. 1 is an isometric rendering of the instant disclosure showing the flared fitting and hose attached prior to installation onto a gas grill.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the disclosure.

In the following description, for the purposes of explanation, numerous specific details are set forth in order to provide a thorough understanding of the described embodiments. It will be apparent to one skilled in the art however that other embodiments of the present disclosure may be practiced without some of these specific details. Several embodiments are described herein, and while various features are ascribed to different embodiments, it should be appreciated that the features described with respect to one embodiment may be incorporated with other embodiments as well. By the same token however, no single feature or features of any described embodiment should be considered essential to every embodiment of the disclosure, as other embodiments of the disclosure may omit such features.

In this application the use of the singular includes the plural unless specifically stated otherwise and use of the terms “and” and “or” is equivalent to “and/or,” also referred to as “non-exclusive or” unless otherwise indicated. Moreover, the use of the term “including,” as well as other forms, such as “includes” and “included,” should be considered non-exclusive. Also, terms such as “element” or “component” encompass both elements and components including one unit and elements and components that include more than one unit, unless specifically stated otherwise.

Lastly, the terms “or” and “and/or” as used herein are to be interpreted as inclusive or meaning any one or any combination. Therefore, “A, B or C” or “A, B and/or C” mean “any of the following: A; B; C; A and B; A and C; B and C; A, B and C.” An exception to this definition will occur only when a combination of elements, functions, steps or acts are in some way inherently mutually exclusive.

As this disclosure is susceptible to embodiments of many different forms, it is intended that the present disclosure be considered as an example of the principles of the disclosure and not intended to limit the disclosure to the specific embodiments shown and described.

The terms gas supply and gas tank are used interchangeably to mean a gas supply that can be attached to the instant disclosure.

The terms fittings and flared fittings are used interchangeably to mean a flared fitting suitable for use in a gas system.

The terms segment notch, segment and notch are used interchangeably to mean an addressable position on the timer tactile dial.

The term tapered fittings as used in the specification is meant to mean either a male or female fitting with tapered threads such as the National Pipe Thread standard thread of any other applicable pipe or tube thread standard.

The term control valve as used in this specification is meant to mean a device for turning off a gas line to a gas appliance such as a gas grill.

The term control valve and timer device and control valve and timer device are used interchangeably in the specification to mean a control valve and timer device of the instant disclosure.

The term BYPASS or bypass may be used throughout the specification. It is contemplated that other appropriate terms may be used without deviating from the heart of the disclosure. Such words may include pass, deactivate, skip, circumvent, evade, avoid, ignore, sidestep, skirt, overstep, dodge, or any other word or identifying mark that may convey to a user of the disclosed device that the below described safety feature is being bypassed or deactivated.

Any terms described herein referencing the term blank may be interchangeable with the term bypass or other similar word described above. Such terms include, but are not limited to, blank segment, blank segment mark, blank segment identifying mark, blank segment notch, blank segment wall, and/or blank segment floor to yield terms bypass segment, bypass segment mark, bypass segment identifying mark, bypass segment notch, bypass segment wall, and/or bypass segment floor Prior to a discussion of the preferred embodiment of the disclosure, it should be understood that while the features and advantages of the disclosure are illustrated in terms of an outdoor gas grill, the disclosure can be used with any type of gas cooking device, such as outdoor portable barbeque grills, outdoor permanent barbeque grills, outdoor gas grills, indoor gas grills, and conventional residential or commercial kitchen stoves.

The instant disclosure is a device which is used in controlling the fuel supply to a gas burning appliance such as a gas grill. When the time on a timer or timing mechanism expires, the gas grill gas supply is automatically shut off to avoid fire hazard and/or wasting of fuel. An adjustable timer is used to activate the gas supply’s automatic shutoff.

The instant disclosure protects the user from a grilling accident. The best way to do that is to prevent the possibility of the accident. The instant disclosure gas grill or appliance shutoff timer turns off your grill after a user’s selected time has been set.

The instant disclosure is connected to the gas grill or appliance by following these simple steps:

a. Connect the gas grill or appliance supply hose to the supply connecter hose; Alternatively, the timer connecter hose can be attached directly to the gas supply or regulator;
b. Connect the timer hose to the gas grill or appliance; and
c. Tighten all connections.

In one embodiment of the present disclosure, a timer and valve body are used with a gas dial in preventing unintentional activation of the timer by requiring the user to first “prime the device” by turning the tactile dial clockwise past the “20” or third segment notch mark and then turn it counterclockwise back to “OFF” position, which is the first segment notch mark. By doing so the user activates the internal timer. This is a safety feature which prevents unintentional activation of the control valve. The control valve of the instant disclosure has two states, “ON” and “OFF.” The on state is when the gas is allowed to flow through the valve and the off state is when the gas is stopped from flowing through the valve.

The user then needs to start the timer. The user sets the timer to the desired time by turning the tactile dial clockwise to the desired countdown time. In a preferred embodiment, the tactile dial is marked with six ten-minute segment notch increments. The timer will automatically rotate counterclockwise and shut off the gas supply when the time is complete and it reaches the “OFF” segment notch. For example, if the user sets the timer to the number 30 on the tactile dial, the timer will run for 30 minutes which is the fourth segment notch and turn off the gas supply once the 30 minutes on the timer has expired. The tactile dial may also be turned off early by simply rotating it counterclockwise to the OFF position. The instant disclosure can utilize any timer which provides the necessary functionality including but not limited to a mechanical timer or electronic timer.

The user has the ability to easily set the timer due to the tactile feel of the timer tactile dial. The timer tactile dial is designed so that the user receives a tactile response from the tactile dial. The tactile dial is configured into at least eight segments. Each segment has a tactile feel to the segment notch which allows the user to feel the tactile dial and select the appropriate time increment without having to look at the tactile dial. Tactile technology involves a physical interaction with the tactile dial and the operator, such that the operator can identify the status of the tactile dial without having to look at the device. This is useful when a control valve is located above or below an object or has an obstructed view.

The timer utilizes a tactile dial which is designed to provide tactile response to the user. The tactile dial is comprised of eight (8) individual segment notches, which have raised and contoured features that provide feedback to the user when using the tactile dial to select a time for the integrated timer of the control valve. In a preferred embodiment the tactile dial is marked with six ten-minute segment notch increments. The segment markings are on the segment floor of each segment notch and start with OFF at the first segment notch, at the second segment notch 10, at the third segment notch 20, at the fourth segment notch 30, at the fifth segment notch 40, at the sixth segment notch 50, at the seventh segment notch 60 and at the eighth segment notch blank no marking. In another embodiment, the eighth segment notch may read BYPASS or any other word or identifying mark indicating the below described safety feature is being circumvented or deactivated. Going in a clockwise direction, the first segment notch represents the OFF position, the second segment notch represents the 10-minute position, the third segment notch represents the 20 minute position, the fourth segment notch represents the 30 minute position, the fifth segment notch represents the 40 minute position, the sixth segment notch represents the 50 minute position, the seventh segment notch represents the 60 minute position, the eighth segment notch is not addressable and does not set the timer. This provides a safety feature so that the timer cannot be set for longer time durations.

In another embodiment, the eighth segment notch may represent a bypass segment for bypassing this safety feature in the event it is desired to set the timer for extended periods of time. In a further embodiment, the timer may include a bypass safety feature preventing the accidental activation of the bypass setting. This bypass safety feature may prevent the dial from turning to the eighth segment notch, therefore preventing the bypass setting from being activated. In such an embodiment, the timer may include a bypass button 420 as shown in FIGS. 18-20, 22, and 23. Depressing the bypass button 420 may deactivate the bypass safety feature, allowing the bypass setting to be activated. In some embodiments, the user may simply need to depress the bypass button and then release it in order to deactivate the bypass safety feature indefinitely until the bypass setting is activated. Activating the bypass setting may automatically reactivate the bypass safety feature in order to prevent accidental reactivation of the bypass setting during future use of the timer. In other embodiments, the bypass button may actually be a bypass switch that, when engaged, may deactivate the bypass safety feature until the user disengages the bypass switch.

Alternatively, the timer segments can be configured as a 3-hour timer, and in this configuration each segment represents half an hour (30 minutes). Other configurations are possible and depend on the mechanical timing device incorporated into the instant disclosure.

The segments are configured as a segment notch and each segment notch provides a discernable finger position for the timer. The instant disclosure segment notches are designed such that each segment notch is comprised of a flat surface which is referred to as a segment floor that is surrounded on three sides by a raised wall. This forms a relief which surrounds the segment notch on three sides. The forward wall of the segment notch, which is proximal to the indicator located on the housing body or the next lowest time selection segment, has a relatively straight and vertical forward wall face. The trailing wall face is sloped away from the forward wall face and is adjacent to the next higher setting. When a segment is viewed at the first position, the trailing wall face is parallel to the line formed by the gas inlet and outlet which is essentially horizontal when viewed, such that the indicator arrow is at the 12 o'clock position.

The indicator is an arrow that is formed into the housing of the body of the timer. The indicator can be formed either as a relief or a counter-relief design. The indicator can also have a stencil applied to make the indicator stand out and to be easily visible to the user. The user positions the desired segment, which relates to the desired time that the user wants to set the timer, so that the desired time is aligned with the indicator. This is easily done because the indicator is raised and easy to feel with the users' fingers.

The segments configuration as a notch provides a discernable finger position for each position of the timer. For example, if the user wants to set a timer to 30 minutes, the timer configured in 10-minute intervals, then the user can place their finger on the tactile dial and position their finger so that it is on the fourth segment, which is easily done by using the fingers to count the forward wall of the segment notches. The forward walls are formed in a relief structure so that the forward wall stands up over the notch floor which forms the segment. The user can then rotate the tactile dial so the desired notch or segment aligns with the indicator arrow that is formed into the housing of the body of the timer. As noted above, this indicator is also in the form of a relief structure that is raised above the surrounding body of the timer so the indicator is easy to identify when the desired segment is aligned with the indicator using only the users' fingers.

Additionally, the instant disclosure provides for a low-cost kit which utilizes the control valve and timer of the instant disclosure, the flare fittings for the output side of the control valve to connect to the gas grill or appliance, the gas supply hose which attaches to the control valve and timer of the instant disclosure, and the flared fittings which attaches to the gas supply hose which is used to connect the control valve to the gas supply. By packaging all the components together into one kit, the instant disclosure provides a synchronized system or kit which can be easily installed by a non-professional and provides a method to simply control a gas grill or appliance to prevent the user from leaving the grill on after the user has finished using the gas grill or appliance. The synchronized system can also be combined with single use tools such as low-cost wrenches or pliers to provide the user with the tools needed to attach the control valve and fittings to the gas grill or appliance. By creating a complete synchronized kit comprising control valve, connectors, and tools, the instant disclosure reduces the barriers for the user to purchase and implement the safety device of the instant disclosure.

The timer of the instant disclosure can be either mechanical or electronic.

The assembly of all the items into a kit makes the installation simple and easy for the user because the parts necessary to connect the control valve and timer of the instant disclosure can be assembled to the existing gas line without using special tools or sealants.

The gas dial can further be in described in a preferred embodiment as a tactile dial for a control valve comprising:

a. the control valve consisting of a timer, a valve, valve body and the tactile dial;
b. the valve enabled to shut off a fluid flow through the valve body;
c. the valve body in communication with the timer and the timer in communication with the valve body and the valve body, the timer and the valve body having a timer indicator mark;
d. the tactile dial comprising first segment notch, a second segment notch, a third segment notch, a fourth segment notch, a fifth segment notch, a sixth segment notch, a seventh segment notch wherein the first segment notch, the second segment notch, the third segment notch, the fourth segment notch, the fifth segment notch, the sixth segment notch and the seventh segment notch are spaced along a circumference of the tactile dial;
e. the first segment notch having a first segment wall, the first segment wall forming three sides of the first segment notch, the first segment notch having an open side opposite the first segment wall, the first segment notch having a first segment floor, the first segment floor having a first segment identifying mark on the first segment floor, the first segment identifying mark is the word OFF and the first segment identifying mark is rotationally enabled to align with a timer indicator mark on the valve body;
f. the second segment notch having a second segment wall, the second segment wall forming three sides of the second segment notch, the second segment notch having an open side opposite the second segment wall, the second segment notch having a second segment floor, the second segment floor having a second segment identifying mark on the second segment floor, the second segment identifying mark is the number 10 and the second segment identifying mark is rotationally enabled to align with a timer indicator mark on the valve body;
g. the third segment notch having a third segment wall, the third segment wall forming three sides of the third segment notch, the third segment notch having an open side opposite the third segment wall, the third segment notch having a third segment floor, the third segment floor having a third segment identifying mark on the third segment floor, the third segment identifying mark is the number 20 and the third segment identifying mark is rotationally enabled to align with a timer indicator mark on the valve body;
h. the fourth segment notch having a fourth segment wall, the fourth segment wall forming three sides of the fourth segment notch, the fourth segment notch having an open side opposite the fourth segment wall, the fourth segment notch having a fourth segment floor, the fourth segment floor having a fourth segment identifying mark on the fourth segment floor, the fourth segment identifying mark is the number 30 and the fourth segment identifying mark is rotationally enabled to align with a timer indicator mark on the valve body;
i. the fifth segment notch having a fifth segment wall, the fifth segment wall forming three sides of the fifth segment notch, the fifth segment notch having an open side opposite the fifth segment wall, the fifth segment notch having a fifth segment floor, the fifth segment floor having a fifth segment identifying mark on the fifth segment floor, the fifth segment identifying mark is the number 40 and the fifth segment identifying mark is rotationally enabled to align with a timer indicator mark on the valve body;
j. the sixth segment notch having a sixth segment wall, the sixth segment wall forming three sides of the sixth segment notch, the sixth segment notch having an open side opposite the sixth segment wall, the sixth segment notch having a sixth segment floor, the sixth segment floor having a sixth segment identifying mark on the sixth segment floor, the sixth segment identifying mark is the number 50 and the sixth segment identifying mark is rotationally enabled to align with a timer indicator mark on the valve body;
k. the seventh segment notch having a seventh segment wall, the seventh segment wall forming three sides of the seventh segment notch, the seventh segment notch having an open side opposite the seventh segment wall, the seventh segment notch having a seventh segment floor, the seventh segment floor having a seventh segment identifying mark on the seventh segment floor, the seventh segment identifying mark is the number 60 and the seventh segment identifying mark is rotationally enabled to align with a timer indicator mark on the valve body; and
l. the eighth segment notch having an eighth segment wall, the eighth segment wall forming three sides of the eighth segment notch, the eighth segment notch having an open side opposite the eighth segment wall, the eighth segment notch having an eighth segment floor and the eighth segment floor having no segment identifying mark on the eighth segment floor.

The tactile dial of the timer may be a mechanical timer.

The tactile dial has the first segment wall comprising a forward wall having a vertical face wherein the vertical face is sloped from 90 to 30 degrees with respect to the segment floor, a trailing wall having a sloping face the sloping face of the trailing wall is sloped from 25 degrees to 45 degrees with respect to the segment floor and a back wall having a sloping face the sloping face of the back wall is sloped from 10 degrees to 45 degrees with respect to the segment floor.

The control valve is primed with gas by turning the tactile dial clockwise past the third segment notch mark and then turning it counterclockwise back to the first segment notch mark.

The timer according to the present disclosure may be a mechanical timer or an electronic timer and in either case has the ability to mechanically switch conditions of a valve in a valve body from an off condition whereby gas is not allowed to flow through the valve body, to an on condition whereby gas is allowed to pass through the valve body. The timer is set to the desired time by turning the tactile dial clockwise to a desired countdown time represented by a segment notch; and the timer rotates counterclockwise and shuts off the control valve when the desired time is complete; and the at first segment notch aligns with the timer indicator mark on the vale body.

A kit for controlling a gas grill, the kit comprising:

a. a valve body having a timer indicator mark;
b. a timer attached to the valve body;
c. a tactile dial attached to the timer;
d. the tactile dial comprising at least one segment notch, the at least one segment notch is formed from a segment floor, the segment floor having a segment floor marking, a segment wall, the at least one segment notch having an open side opposite the segment wall, the segment wall forming three sides of the at least one segment notch and the segment wall forming three sides such that the at least one segment notch and is the at least one segment notch rotatably alignable such that a user can align the at least one segment by aligning the segment floor marking with the timer indicator mark;

e. a gas supply connecting flared output fitting;

f. an output hose;

g. a hose connector; and h. at least one wrench.

The kit at least one wrench is a set of two wrenches.

Referring now to the drawings FIG. 1-16, and more particularly to FIG. 1, there is shown an isometric rendering of the instant disclosure showing assembly 100, control valve and timer device 110, tactile dial 105, flared input fitting 115, output hose 120 and gas supply connecting flared output fitting 125. The proximal end 900 of assembly 100 is at the flared input fitting 115 and the distal end 910 of assembly 100 is at the output hose 120 connecting flared output fitting 125. The control valve and timer device 110 of the instant disclosure has two states; an ON state and an OFF state. The ON state is when the gas flow is allowed to flow through the control valve and timer device 110 and the OFF state is when the gas is stopped from flowing through the control valve and timer device 110. When the timer 210 {FIG. 2} is enabled, the control valve and timer device 110 is on, and when the timer has reached the off position, the control valve and timer device 110 is off which stops the flow of gas through the valve.

Figure 2:
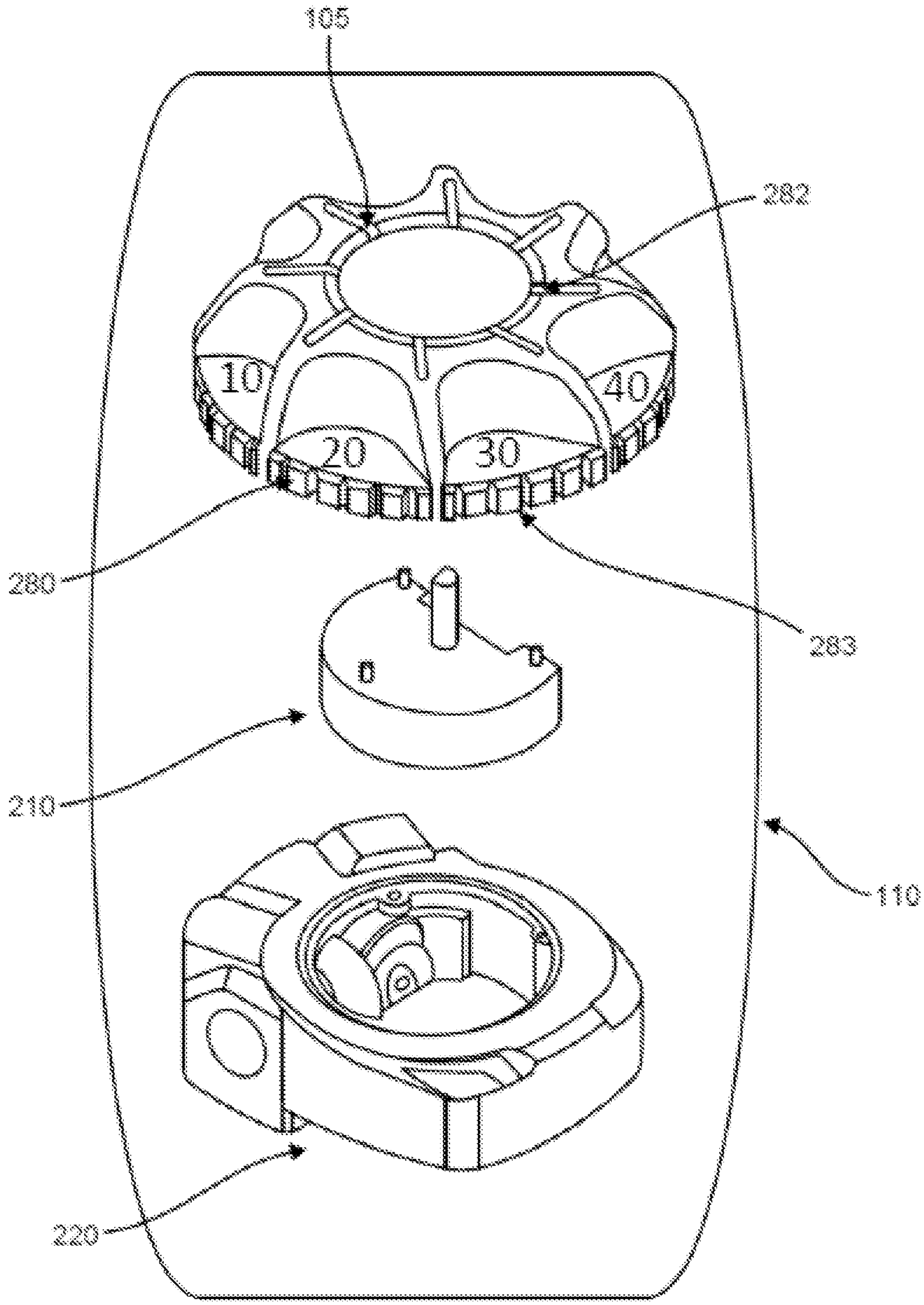
FIG. 2 is an isometric rendering exploded view of the instant disclosure.

Referring to FIG. 2, there is shown an isometric rendering of an exploded view of the control valve and timer or timer device 110. The control valve and timer 110 of the instant disclosure is comprised of a dial or tactile dial 105, timer 210 and the valve body 220. The tactile dial 105 has opposing surfaces, a top surface 282, and a bottom surface 283, and an outer edge 280. The dial 105 may be used with any timer which provides the necessary functionality including but not limited to a mechanical timer or an electronic timer.

Figure 3:
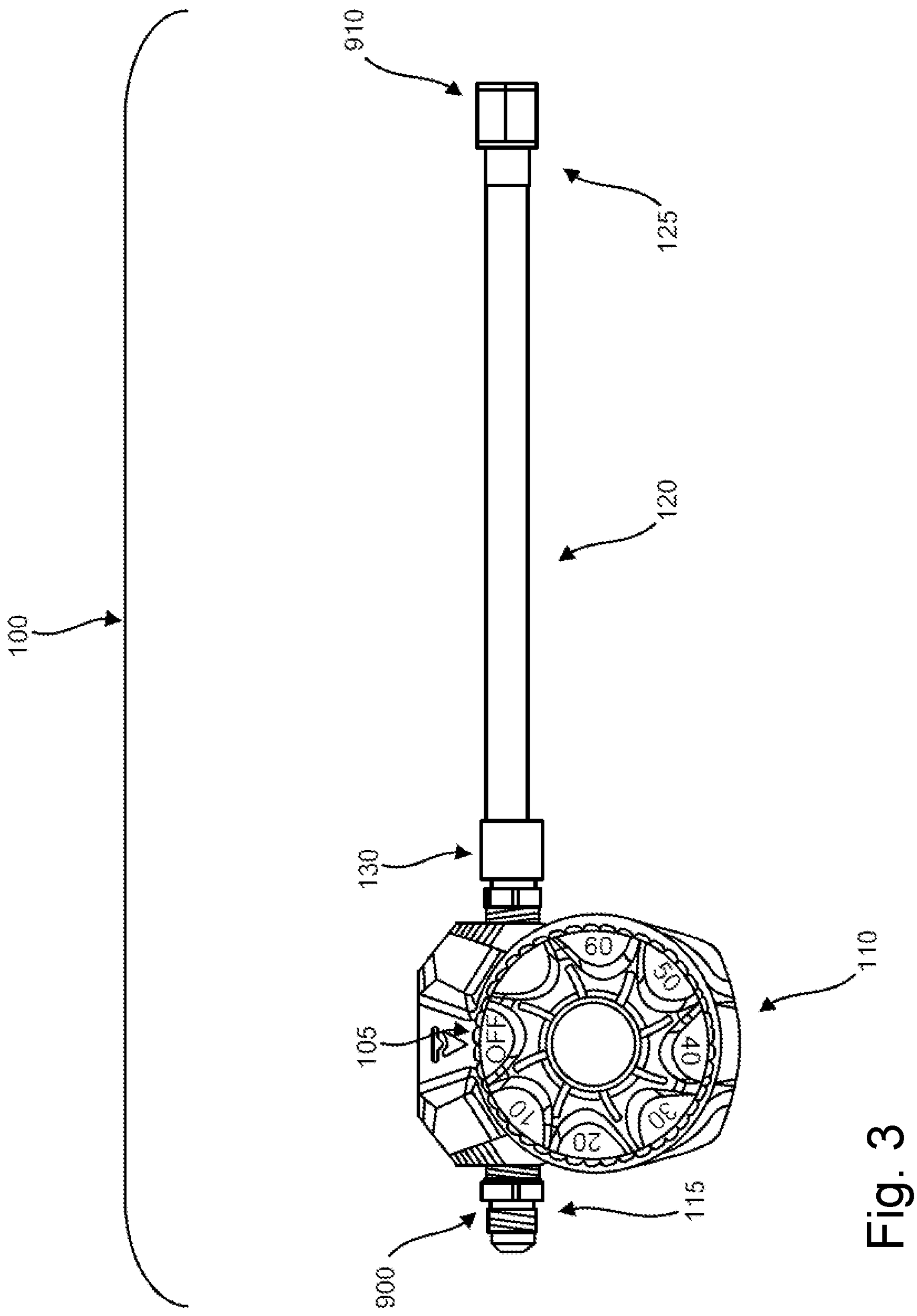
FIG. 3 is a line drawing plan view of the instant disclosure showing the flared fittings and hose attached prior to installation onto a gas grill.

Referring to FIG. 3 there is shown a line drawing plan view of the instant disclosure including assembly 100, control valve and timer device 110 of the instant disclosure, tactile dial 105, flared input fitting 115, output hose 120, and hose connector 130 which is attached to the output hose 120 which is used to attach the output hose 120 to the gas grill or appliance using the gas supply connecting flared output fitting 125 on the distal end 910 of the output hose 120.

Figure 4:
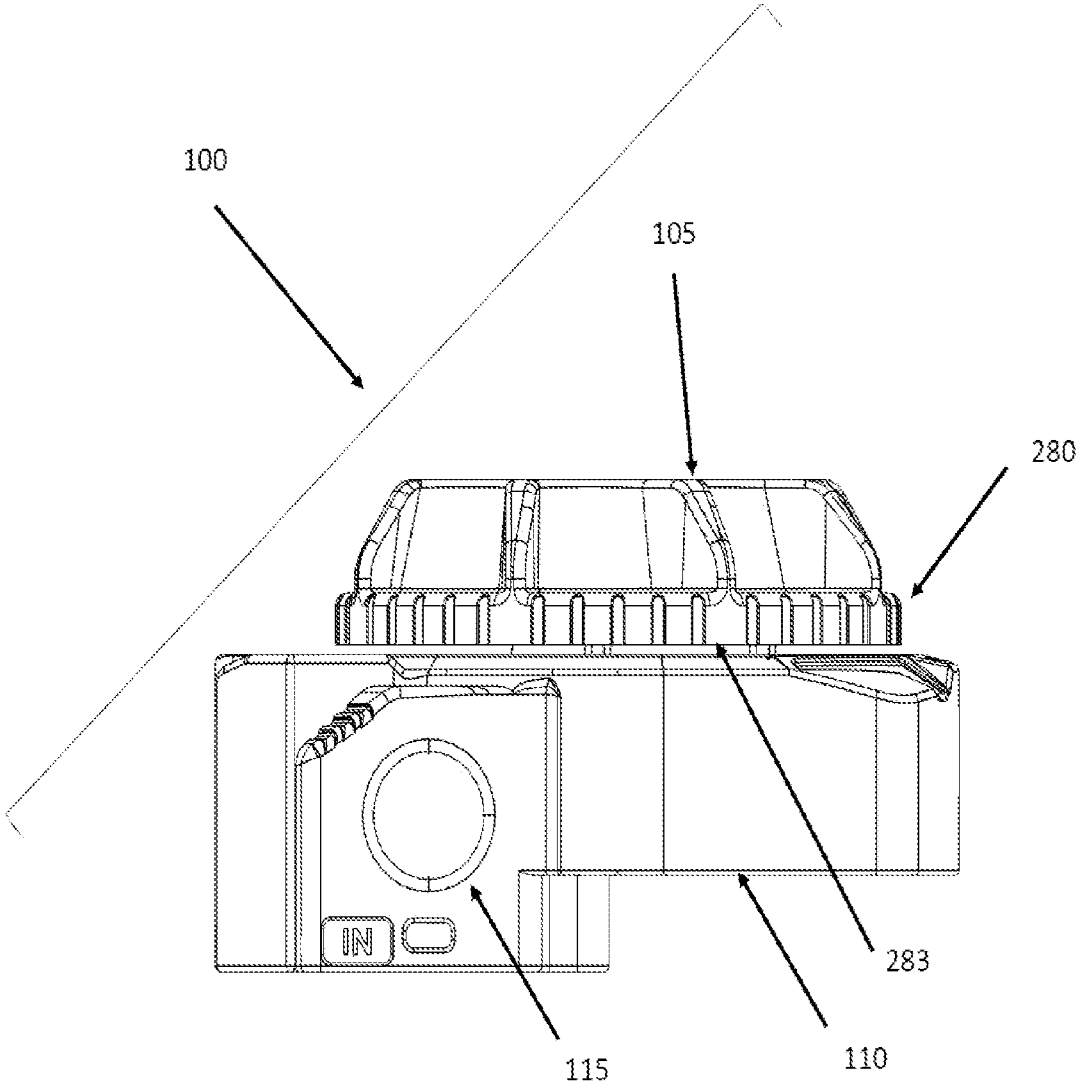
FIG. 4 is a line drawing of the right-side view of the instant disclosure.
Figure 18:
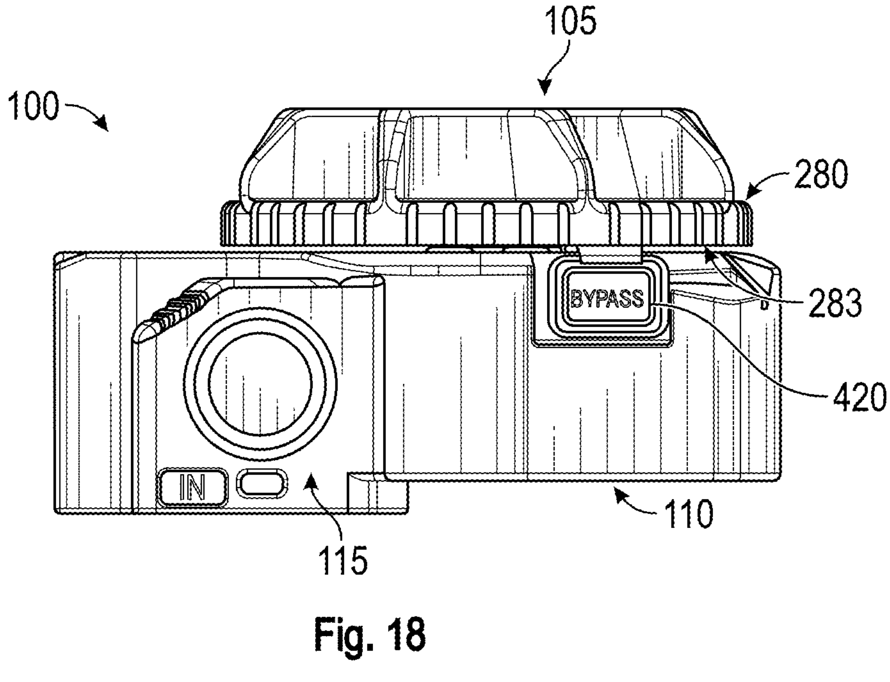
FIG. 18 is a line drawing of the right-side view with a bypass button of the instant disclosure.

Referring to FIG. 4 there is shown a line drawing right side view of the instant disclosure including the assembly 100, control valve and timer device 110 of the instant disclosure, tactile dial 105, and flared input fitting 115. Note that the word "IN" is marked on the right side of the control valve and timer device 110 of the instant disclosure. The view also shows bottom surface 283, and an outer edge 280. FIG. 18 shows a similar embodiment that also includes a bypass button.

Figure 5:
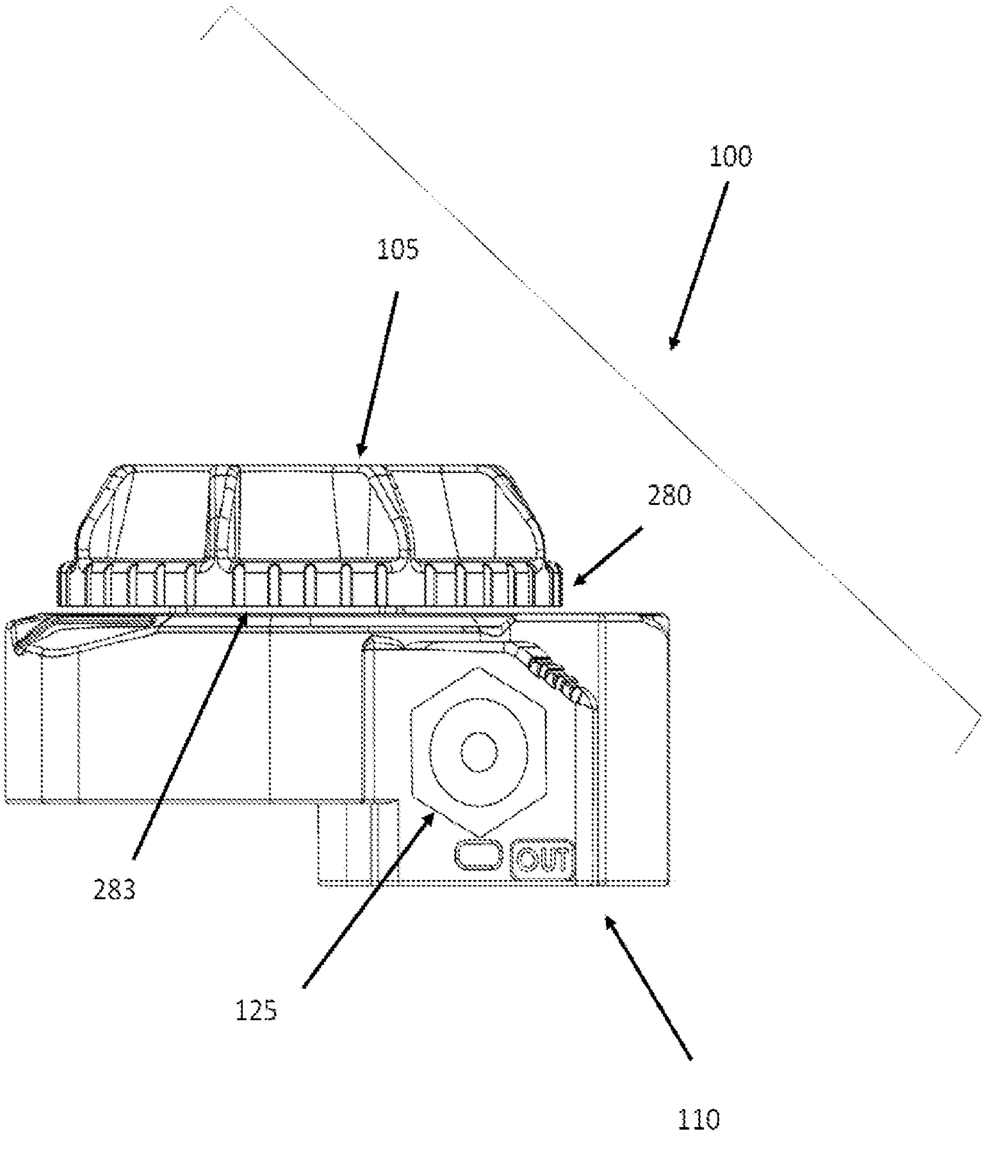
FIG. 5 is a line drawing of the left side view of the instant disclosure.
Figure 17:
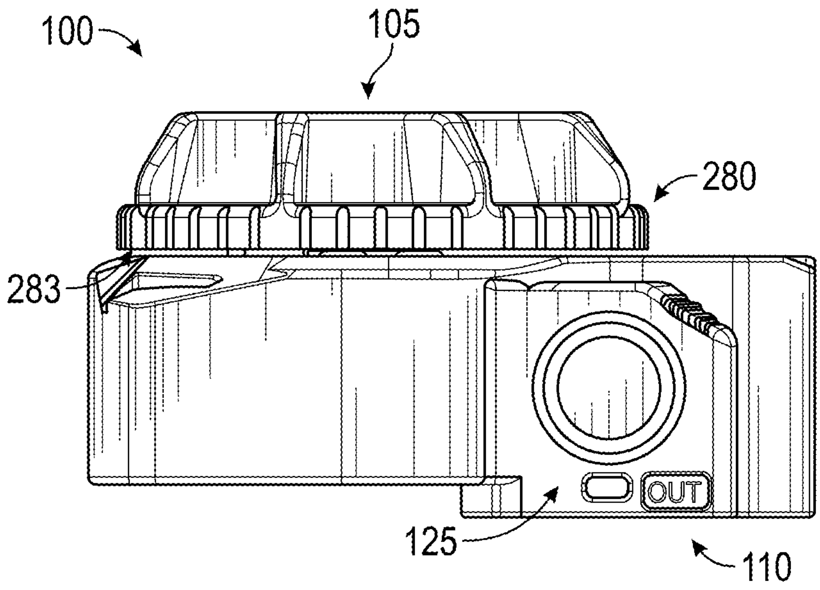
FIG. 17 is a line drawing of the left side view of the instant disclosure.

Referring to FIG. 5 and FIG. 17, there is shown a line drawing left side view of the instant disclosure including the assembly 100, control valve and timer device 110 of the instant disclosure, tactile dial 105, and gas supply connecting flared output fitting 125. Note that the word "OUT" is marked on the left side of the control valve and timer device 110 of the instant disclosure. The view also shows bottom surface 283, and an outer edge 280.

Figure 6:
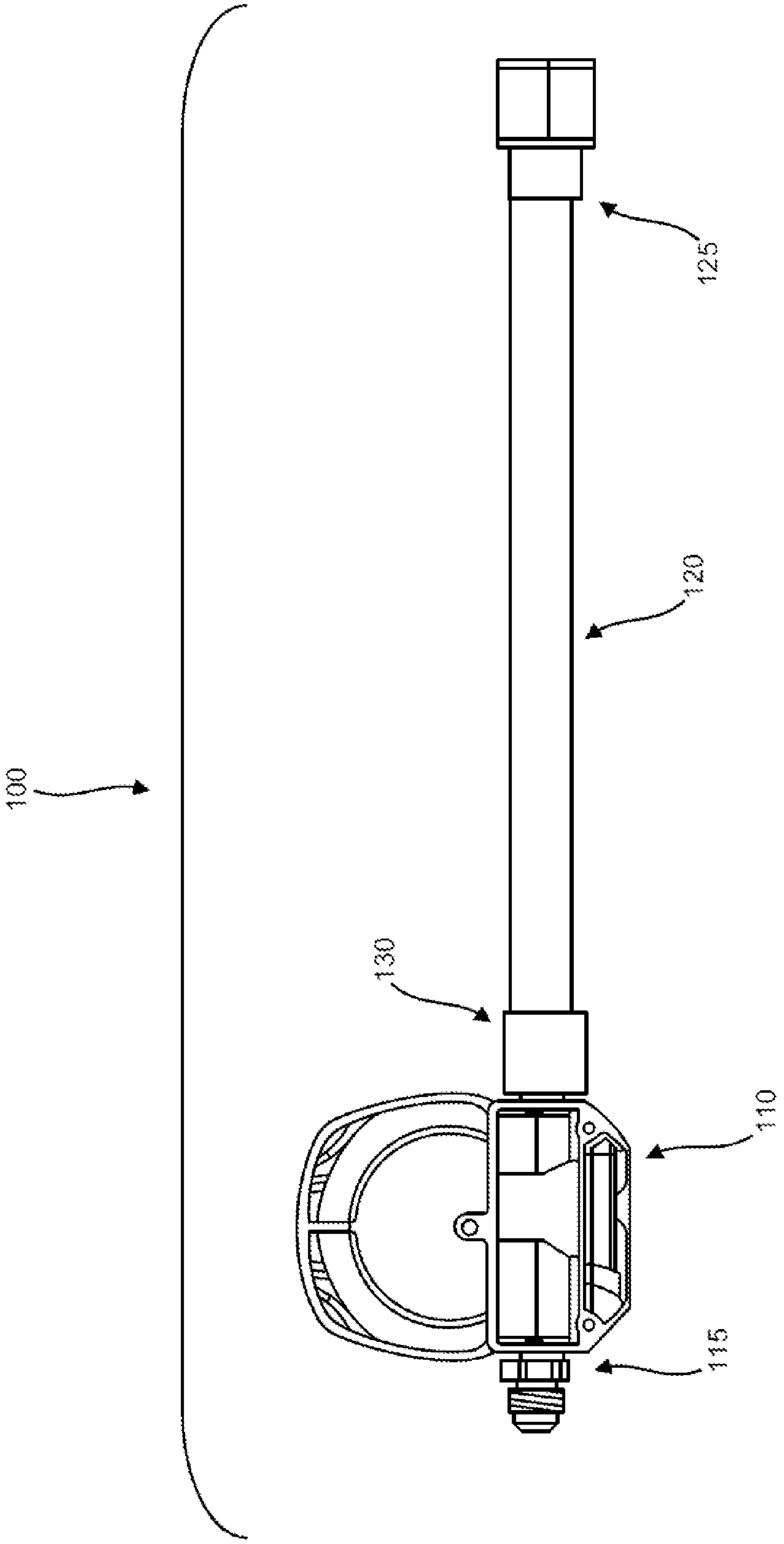
FIG. 6 is a line drawing of the bottom view of the instant disclosure.

Referring to FIG. 6 there is shown a line drawing bottom view of the instant disclosure including assembly 100, control valve and timer device 110 of the instant disclosure, flared input fitting 115, output hose 120, flared output fitting 125, hose connector 130 attached to output hose 120. The output hose 120 is used to attach the control valve and timer device 110 to the gas grill or appliance (not shown) on the distal end of the control valve and timer device 110 of the instant disclosure, using the gas supply connecting flared output fitting 125 on the distal end 910 of the output hose 120.

Figure 7:
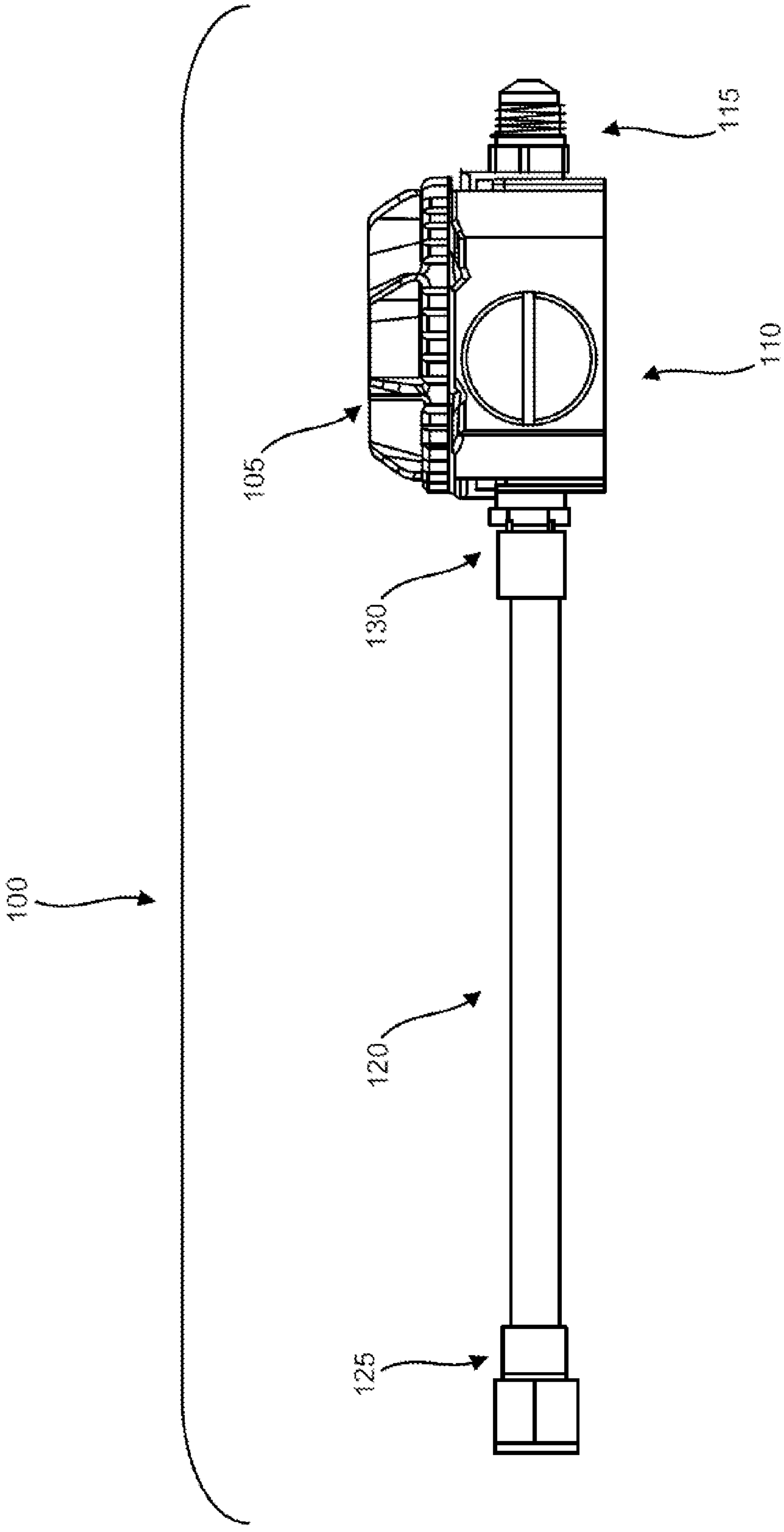
FIG. 7 is a line drawing of the back side view of the instant disclosure.
Figure 21:
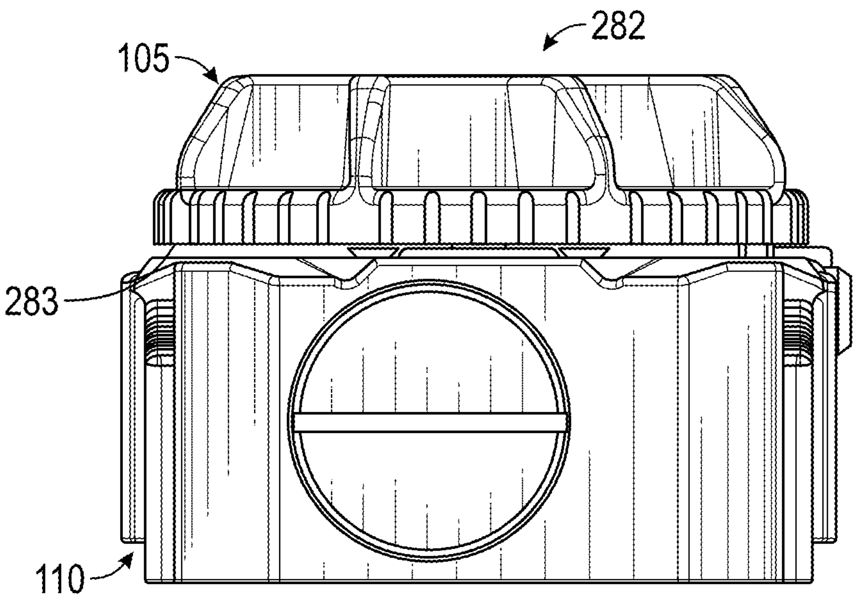
FIG. 21 is a line drawing of the back side view of the instant disclosure without the output fitting or the output hose.

Referring to FIG. 7 there is shown a line drawing back view of the instant disclosure including assembly 100, control valve and timer device 110 of the instant disclosure, tactile dial 105, flared input fitting 115, output hose 120, hose connector 130 attached to the output hose 120. FIG. 21 shows the same without the fittings or the output hose.

Figure 8:
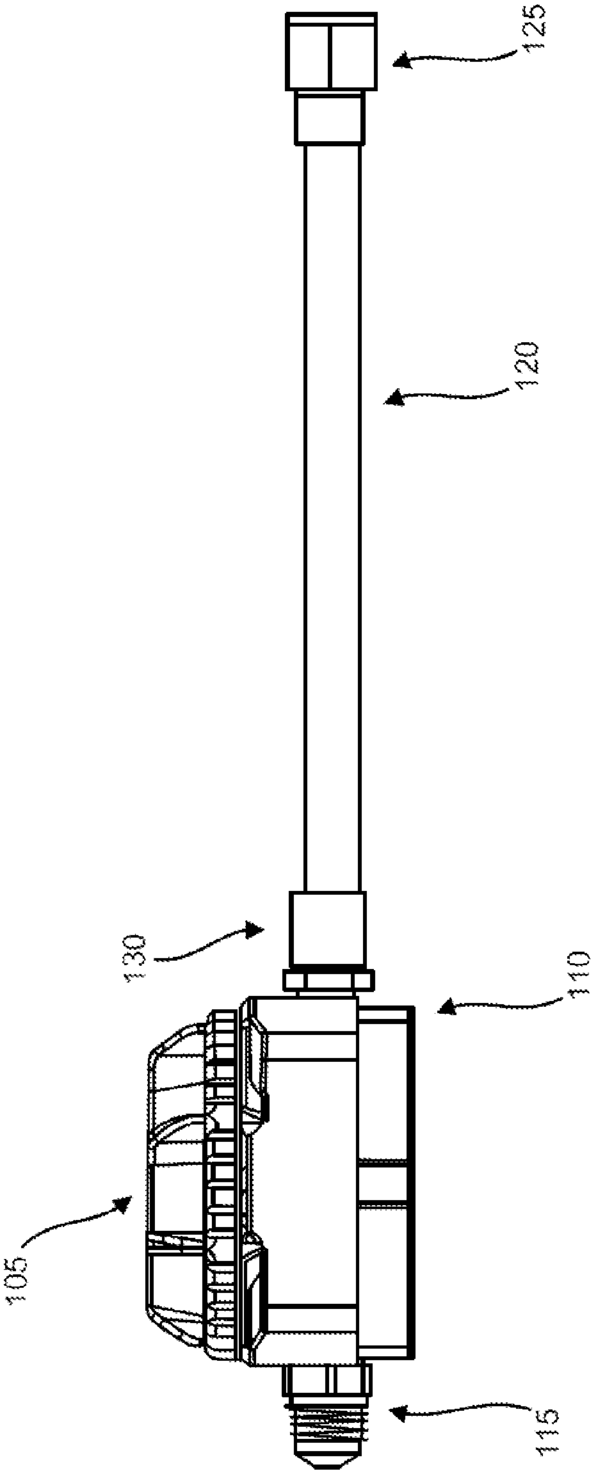
FIG. 8 is a line drawing of the front side view of the instant disclosure.
Figure 22:
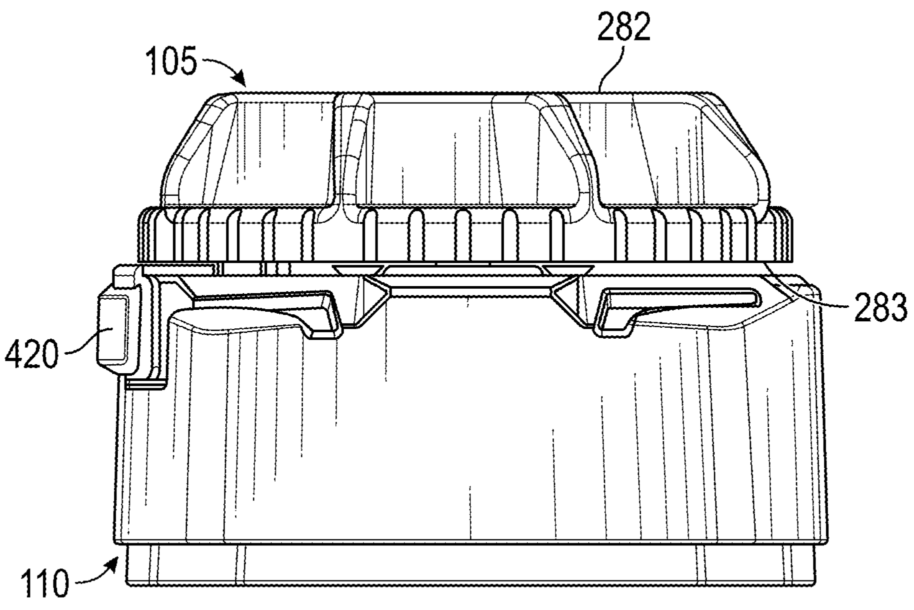
FIG. 22 is a line drawing of the front side view of the instant disclosure without the output fitting or the output hose.

Referring to FIG. 8 there is shown a line drawing front view of the instant disclosure including assembly 100, control valve and timer device 110 of the instant disclosure, tactile dial 105, flared input fitting 115, output hose 120, hose connector 130 attached to output hose 120. The output hose 120 is used to attach the control valve and timer device 110 to the gas grill or appliance (not shown) on the distal side of the control valve and timer device 110 of the instant disclosure using the gas supply connecting flared output fitting 125 on the distal end 910 of the output hose 120. FIG. 22 shows the same, zoomed-in image of the dial without the fittings or hose.

Figure 9:
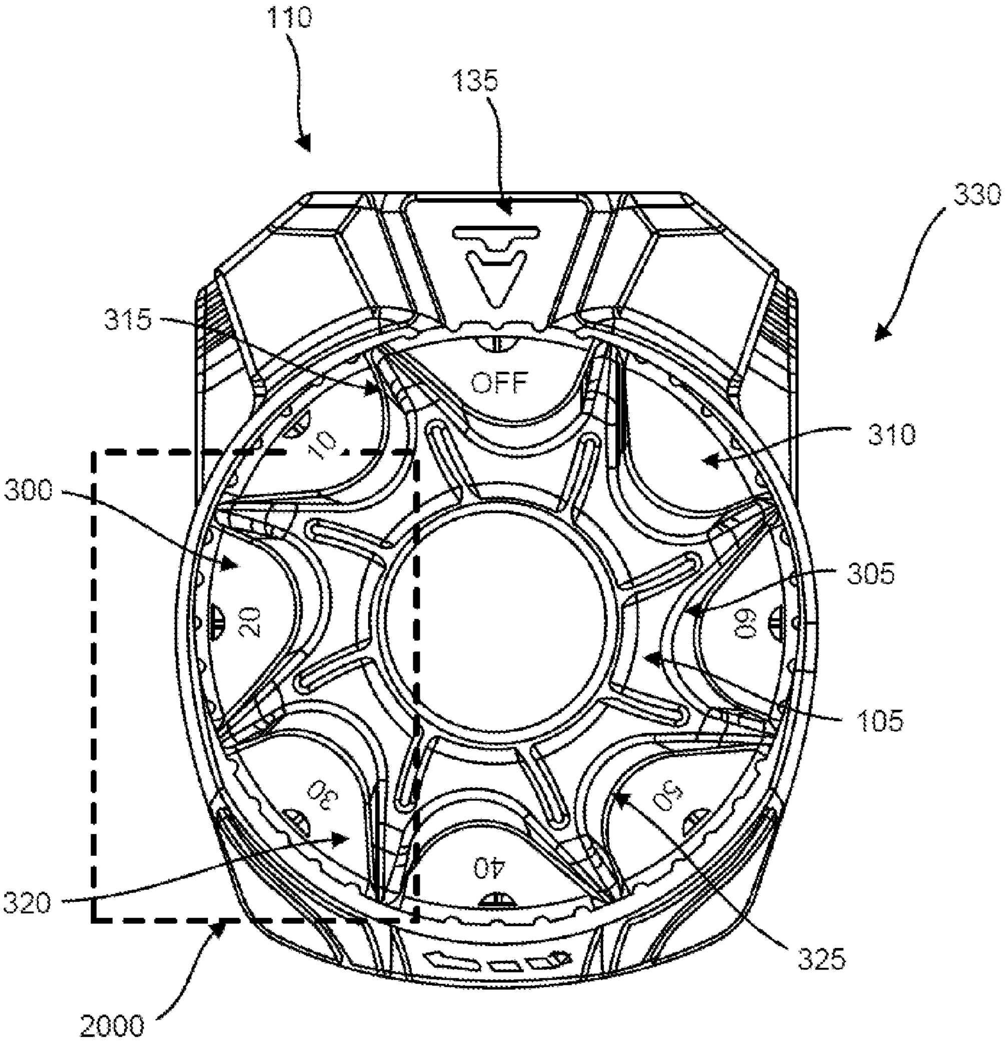
FIG. 9 shows a plan view line drawing of the timer and valve of the instant disclosure without the output fitting or the output hose.
Figure 9A:
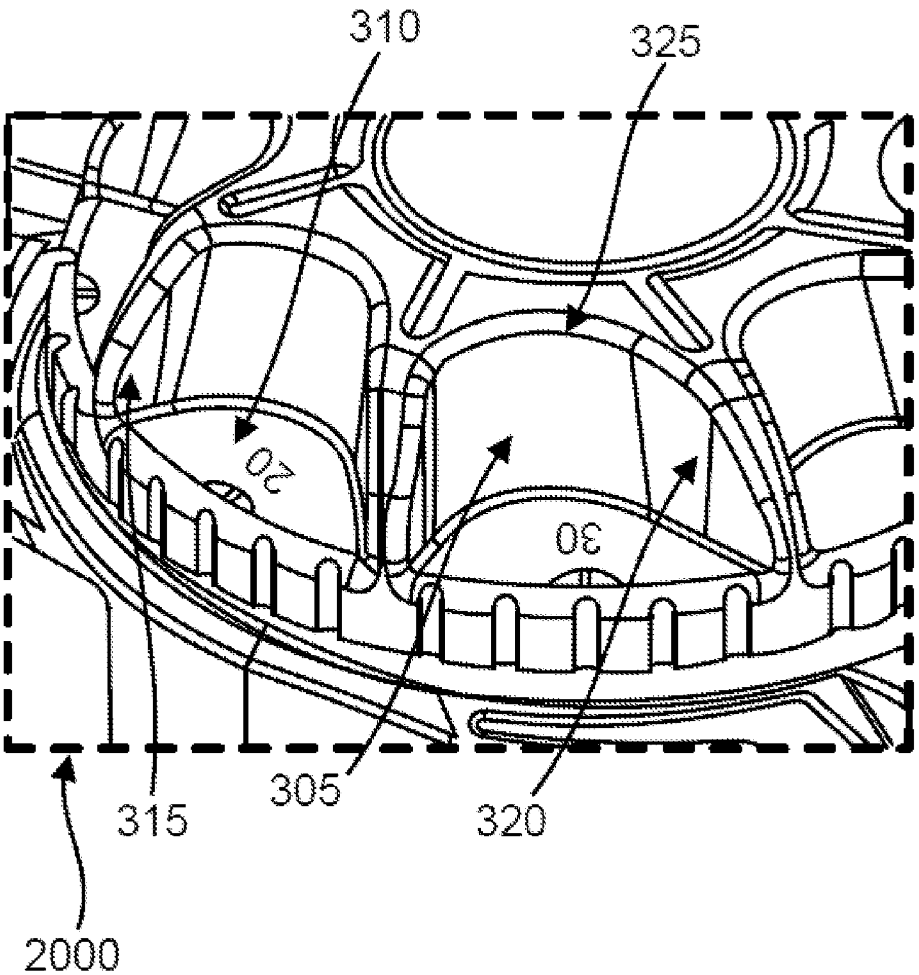
FIG. 9A shows a zoomed in isometric view of the notch segments 20 and 30 which are used as refence notch segments for illustration purposes.

FIG. 9 shows a plan view line drawing of the instant disclosure and FIG. 9A shows a zoomed in isometric view of the notch segments 20 and 30, 2000, which is used as reference notch segments for illustration purposes. Each notch segment has a segment floor 310, segment wall 325 that is comprised of the forward wall 315 having a forward wall face, the trailing wall 320 having a trailing wall face and the back wall 305 having a back wall face thereby surrounding the segment floor 310 on three sides by a segment wall 325.

Figure 19:
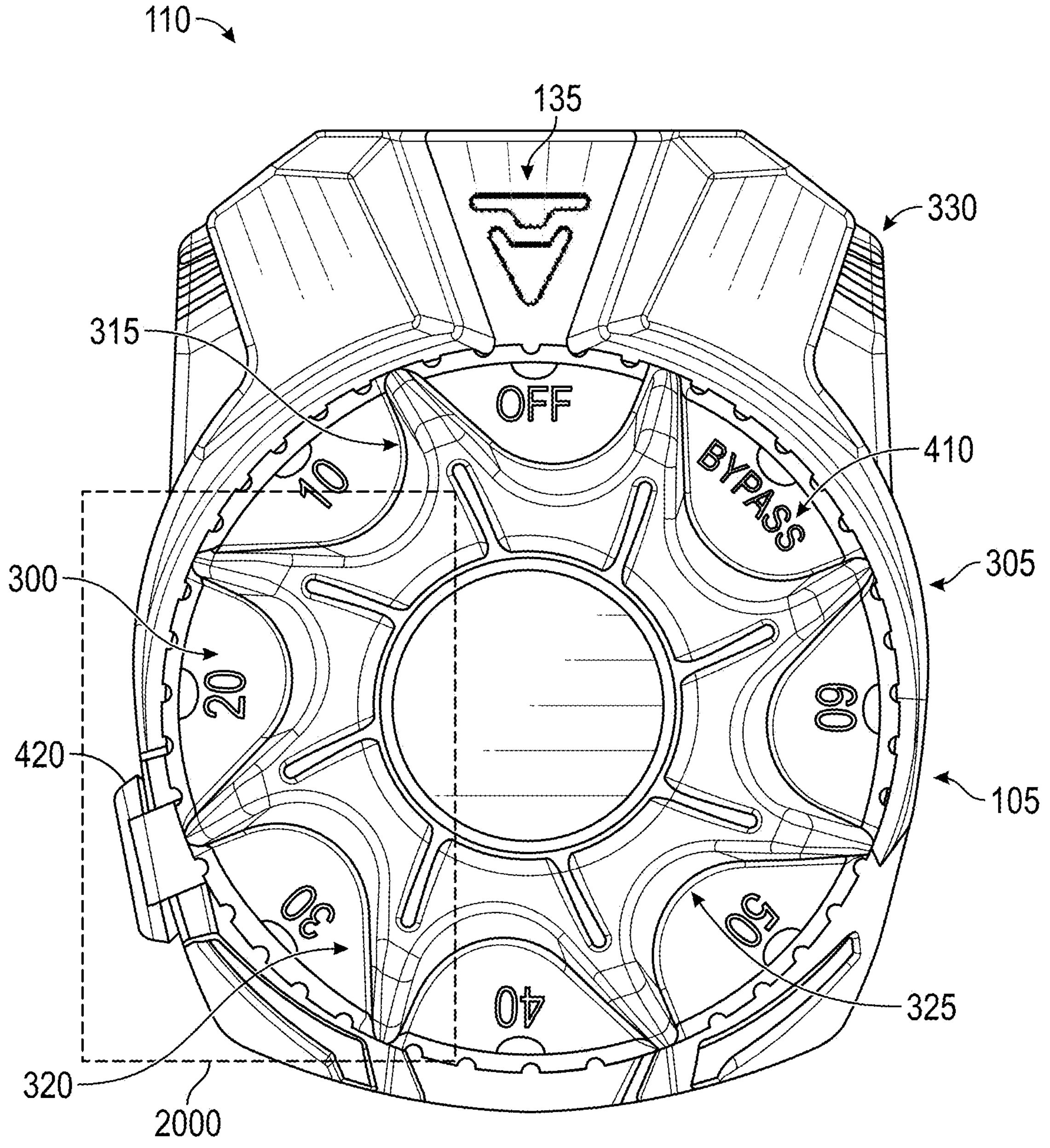
FIG. 19 shows a plan view line drawing of the timer and valve with the bypass indicator of the instant disclosure without the output fitting or the output hose.

Referring to FIG. 9, FIG. 9A, and FIG. 19 there is shown the control valve and timer device 110 of the instant disclosure, and tactile dial 105 of the instant disclosure, without input fitting 115 or the output hose 120. The timer indicator mark 135 is shown in the 12 o'clock position. The control valve and timer device 110 is in the "OFF" position when the segment notch 300 with the OFF marking on the segment floor is aligned with the timer indicator mark 135. The instant disclosure segment notch 300 is designed such that each segment notch 300 is comprised of a relatively flat surface segment floor 310 which is proximal to the segment wall 325 which can be formed perpendicular to the segment floor 310 and the segment wall 325 can have a slopped or angled wall face where the angle is vertical to 45 degrees. Segment floor 310 and segment wall 325 thereby forms the segment notch 300. The segment wall 325 is further comprised of the forward wall 315 having a forward wall face, the trailing wall 320 having a trailing wall face and the back wall 305 having a back wall face thereby surrounding the segment floor 310 on three sides by a raised segment wall 325. This forms a relief which surrounds the segment notch 300 on three sides. Using the segment notch 10 as a reference, the forward wall 315 of the segment notch 300 is proximal to the indicator 135 located on the housing body. As shown in FIG. 9 and FIG. 19, when viewing the other segment notches represented in segments marked as OFF, 20, 30, 40, 50, 60 and blank or BYPASS 410 indicators such that the forward wall 315 of segment notch 300 is proximal to the next lowest time or the OFF-indicator segment notch 300. The forward wall 315 has a relatively straight and vertical forward wall face. The trailing wall face 320 is sloped away from the forward wall 315 face and it is adjacent to the next higher setting. When a segment notch 300 is viewed at the first position, such as segment notch 10 indicator as shown in FIG. 9, the trailing wall 320 having a trailing wall face is approximately parallel to the reference line 330 formed by the gas inlet and outlet which is essentially horizontal when viewed in a plan view such as FIG. 9 such that the indicator 135 is at the 12 o'clock position. The forward wall 315 has a somewhat vertical face perpendicular segment floor 310. However, in some embodiments it can have a slope of up to a 30-degree angle with respect to the segment floor 310. The trailing wall face 320 is preferably sloped between a 25- to 45-degree angle with respect to the segment floor 310. The back wall face 305 is preferably sloped between a 10- to 45-degree angle with respect to the segment floor 310. The forward wall 315, trailing wall 320 and back wall 305 thereby forms the segment wall 325 which forms a tactile feature, which is easy to identify by a user using only the individual's finger. The tactile feature allows the individual to sense the segment notch 300 and segment wall 325, which forms a tactile feature, using only their sense of touch associated with a finger, allowing the individual to align the desired segment notch by aligning the segment notch with the timer indicator mark 135 to set the desired time on the timer. Once set, the timer 210 part of the control valve and timer device 110 holds the valve in the open position until the timer "OFF" indicator is aligned with the timer indicator mark 135. Because of the tactile field of the segment notch 300, the user of the instant disclosure can easily count the segment notches 300 and align the desired notch with the timer indicator mark 135 thereby setting the desired time.

Figure 10:
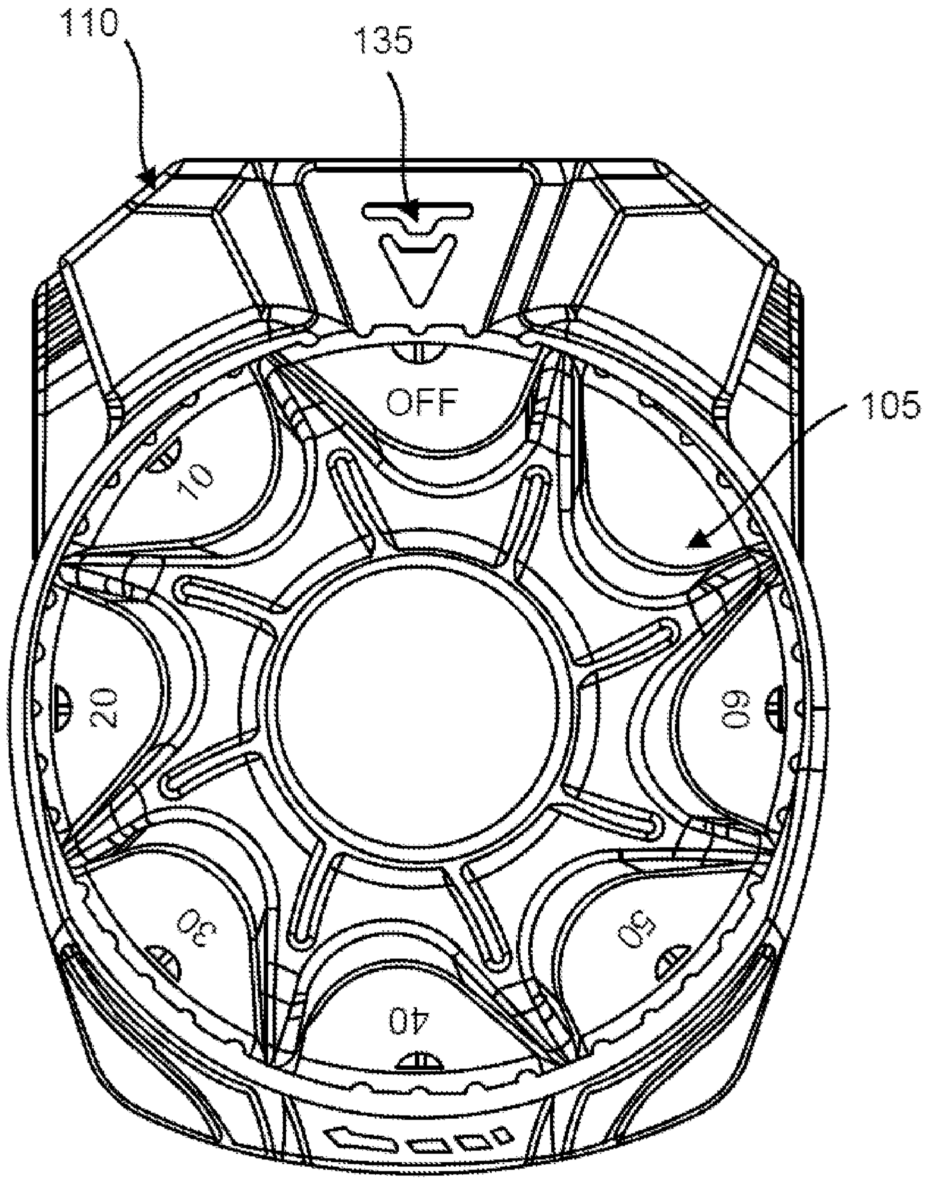
FIG. 10 shows a plan view rendering of the timer and valve of the instant disclosure without the fittings or the hose.

FIG. 10 shows a plan view rendering of the control valve and timer device 110 of the instant disclosure and tactile dial 105 of the instant disclosure without input fitting 115 or the hose 120. The timer indicator mark 135 is shown. FIG. 19 shows a similar embodiment that includes a bypass segment in place of the blank segment.

Figure 11:
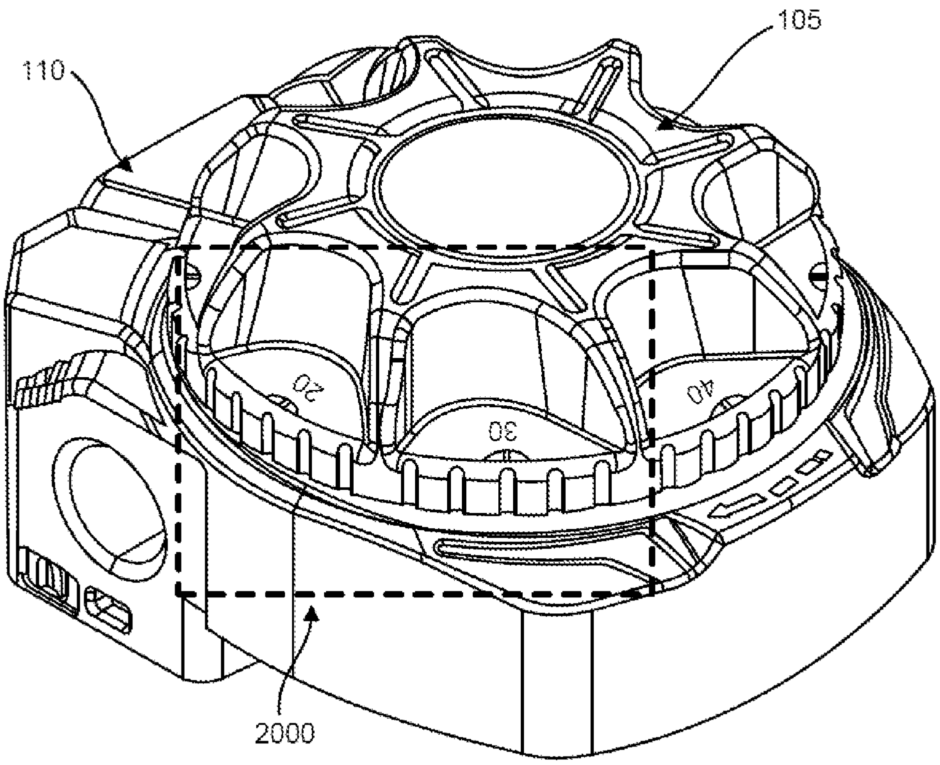
FIG. 11 shows an isometric line drawing of the timer and valve of the instant disclosure without the fittings or the hose.
Figure 20:
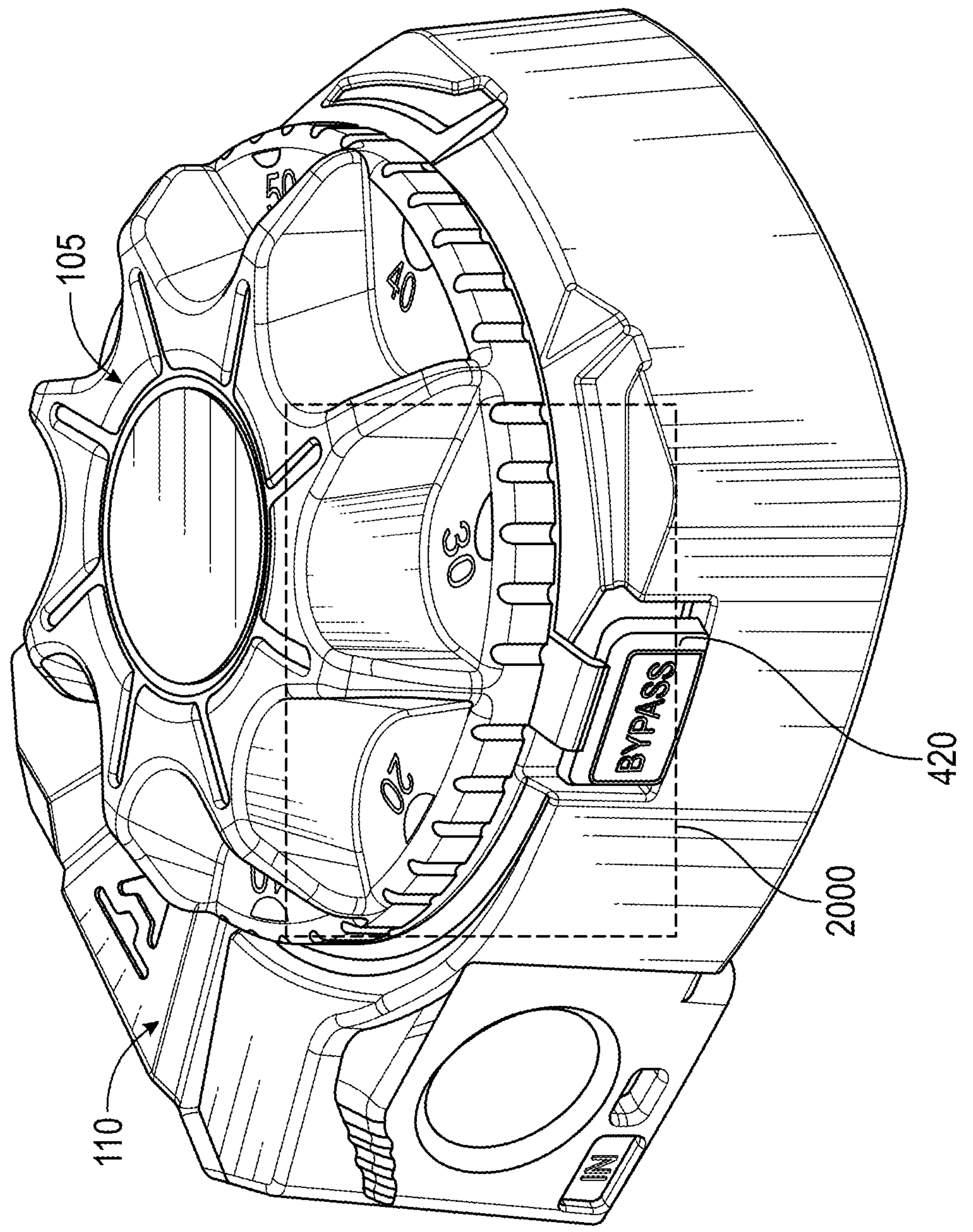
FIG. 20 shows an isometric line drawing of the timer and valve with the bypass button of the instant disclosure without the output fitting or the output hose.

FIG. 11 shows an isometric line drawing of the control valve and timer device 110 of the instant disclosure and tactile dial 105 of the instant disclosure without input fitting 115 or the output hose 120. The zoom in area 2000 of FIG. 9A is shown for reference. FIG. 20 shows a similar embodiment that also includes a bypass button.

Figure 12:
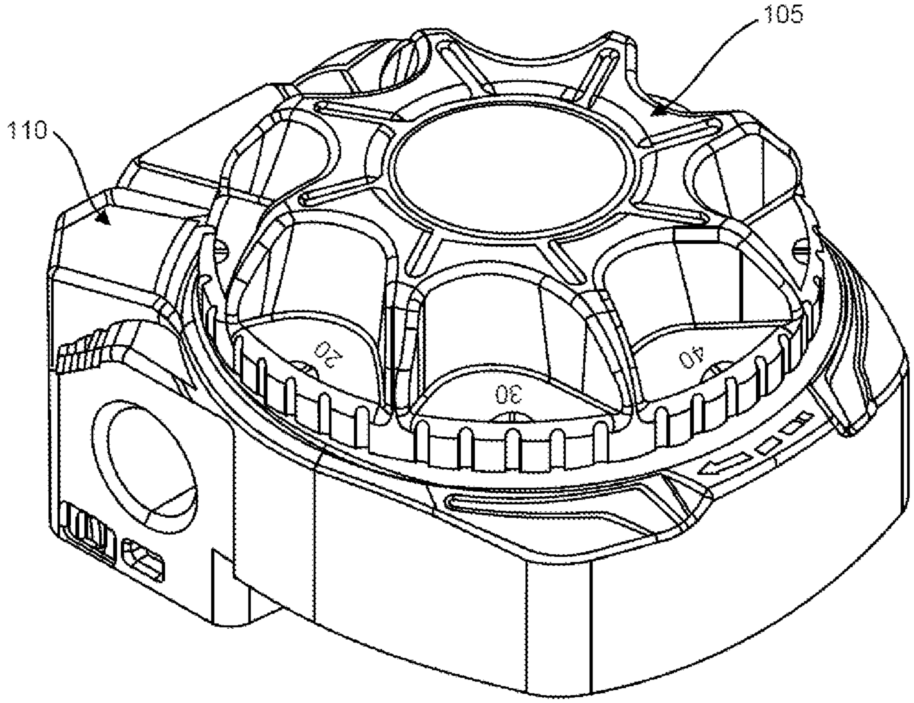
FIG. 12 shows an isometric rendering of the timer and valve of the instant disclosure without the fittings or the hose.

FIG. 12 shows an isometric surfaced view of the control valve and timer device 110 of the instant disclosure and tactile dial 105 of the instant disclosure without input fitting 115 or the output hose 120.

Figure 13:
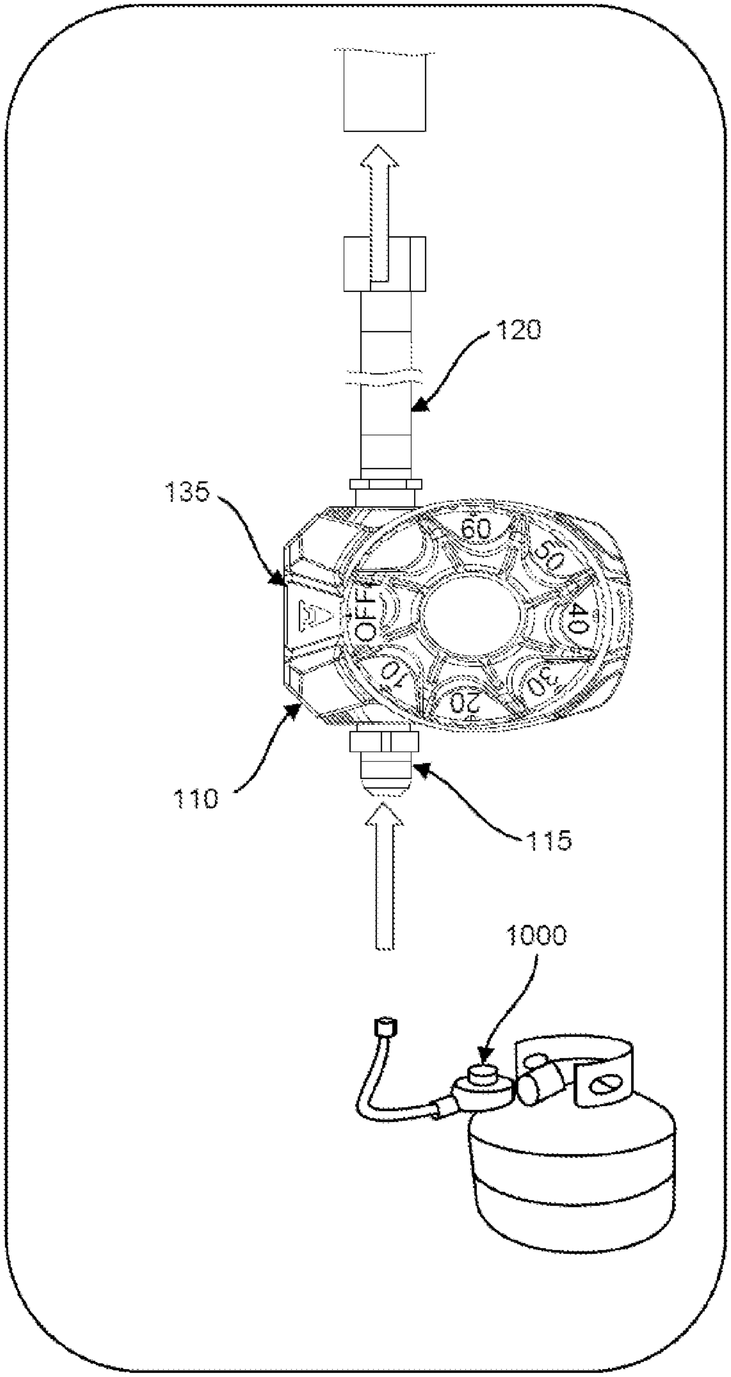
FIG. 13 shows a schematic of the instant disclosure being connected to a gas supply line after a regulator.

FIG. 13 shows a schematic of the instant disclosure being connected to a gas supply line after a regulator 1000. The timer indicator 135 is shown on the control valve and timer device 110 of the instant disclosure. The input fitting 115 and the output hose 120 are also identified.

Figure 14A:
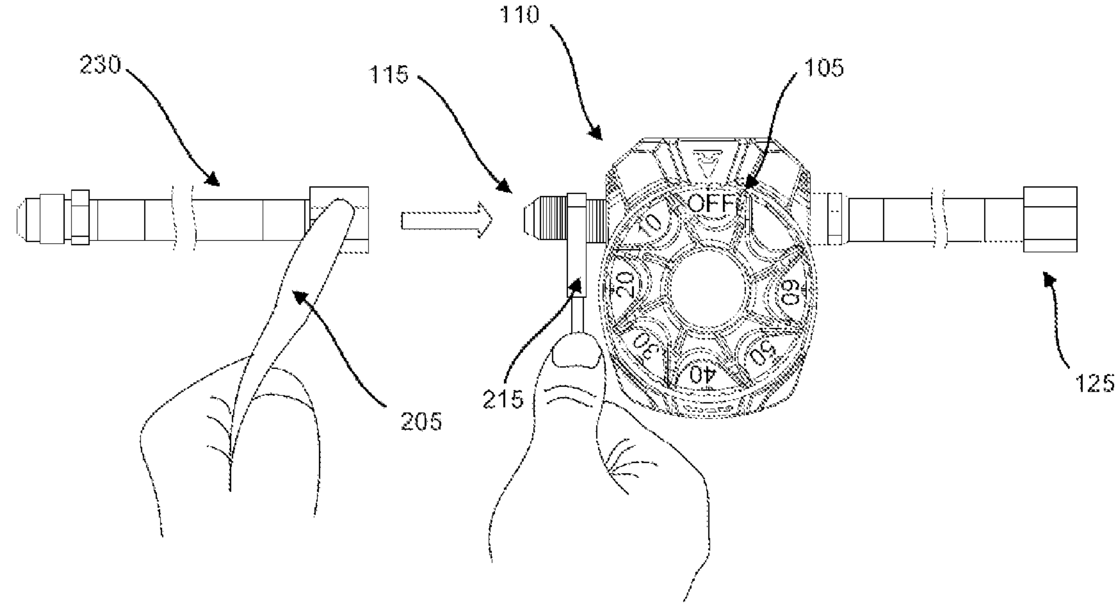
FIG. 14A shows a detailed assembly schematic of the instant disclosure being connected to a gas grill supply line.

FIG. 14A shows connecting the instant disclosure control valve and timer device 110 of the instant disclosure, tactile dial 105, flared input fitting 115 to the input hose 230. Wrench 205 and wrench 215 are used to tighten the input fitting 115. The input hose 230 is attached to the gas supply. Flared output fitting 125 is the connected to the gas grill or appliance in FIG. 14B.

Figure 14B:
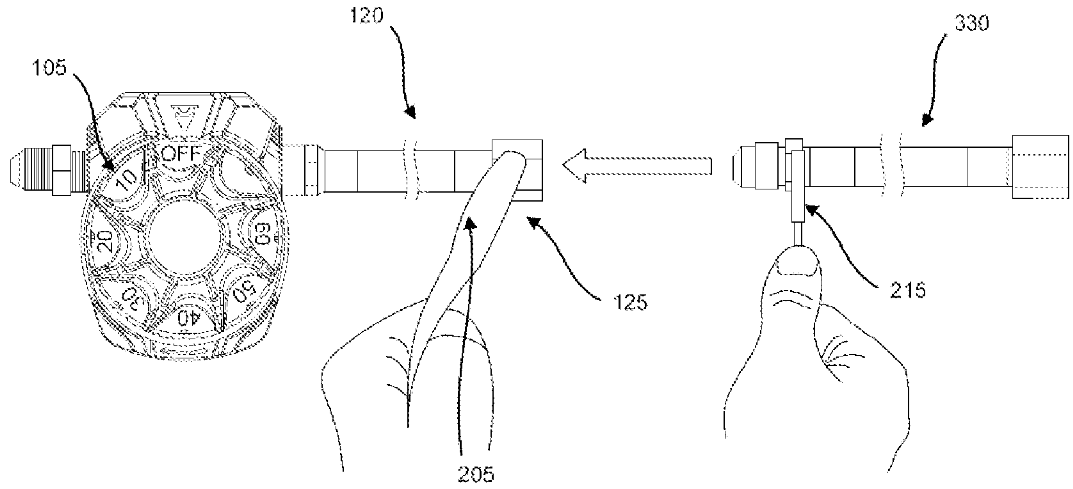
FIG. 14B shows a detailed assembly schematic of the instant disclosure being connected to a gas supply line after a regulator.

FIG. 14B shows connecting the instant disclosure control valve and timer device 110 of the instant disclosure, tactile dial 105, gas supply connecting flared output fitting 125 to the gas grill supply hose 330. Wrench 205 and wrench 215 are used to tighten the flared output fitting 125.

Figure 15:
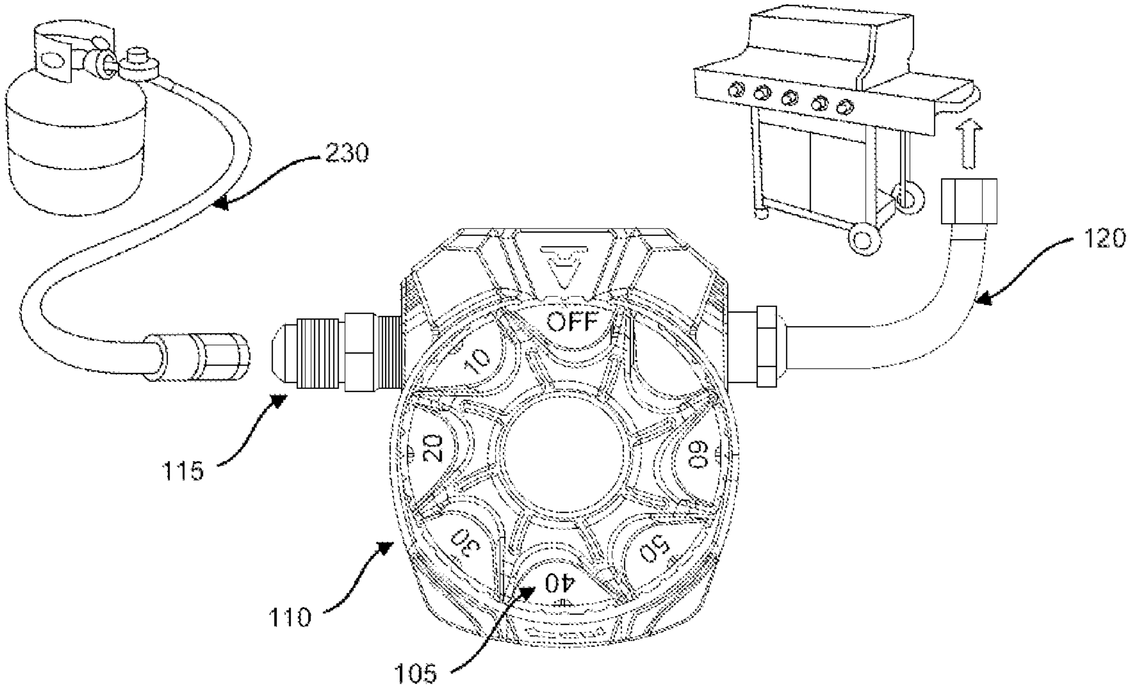
FIG. 15 shows a detailed assembly schematic of the instant disclosure being connected to a gas supply line after a regulator and the gas supply tank and before the gas grill.

FIG. 15 shows a detailed assembly schematic of the control valve and timer device 110 of the instant disclosure with tactile dial 105 and the output hose 120 being connected to the gas grill and the flared input fitting 115 is connected to the gas supply hose 230.

Figure 16:
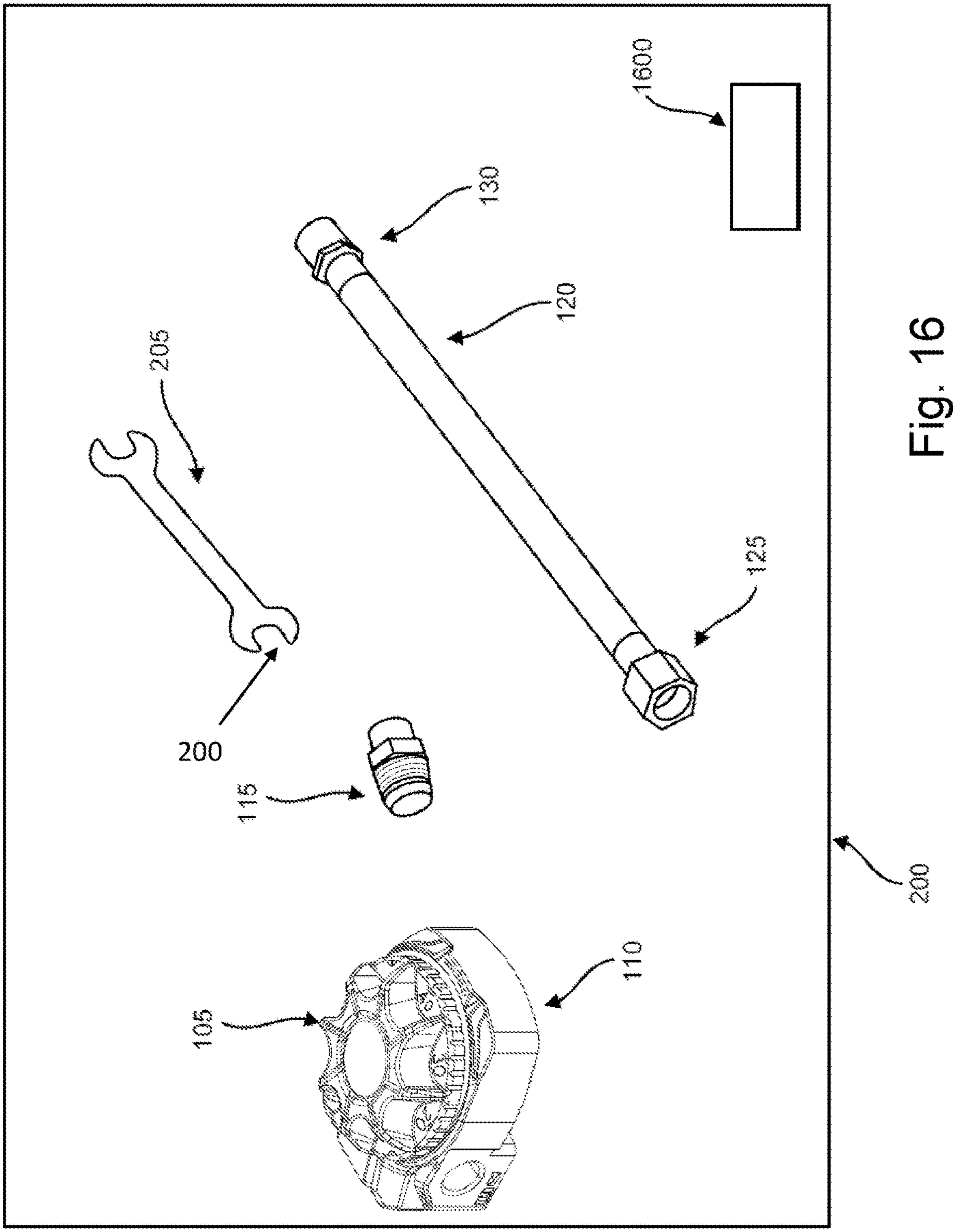
FIG. 16 shows an isometric rendering of the kit of the instant disclosure.

FIG. 16 shows an isometric rendering of the synchronized kit 200 of the instant disclosure which has control valve and timer device 110, flared input fitting 115, output hose 120, gas supply connecting flared output fitting 125, tactile dial 105, hose connector 130 and at least one wrench 205. The kit provides all the components that a user would need to simply connect the valve and timer of the instant disclosure 110 to a gas grill appliance and gas supply such as a regulated propane tank. The synchronized kit 200 can alternatively have a second wrench 215 not shown. Alternatively, if desired the kit can be provided without a wrench 215 and would therefore have only the following parts in the kit (1) control valve and timer device 110, (1) flared input fitting 115, (1) output hose 120, (1) gas supply connecting flared output fitting 125, (1) tactile dial 105 and (1) hose connector 130. Preferably the synchronized kit 200 would come in a box with the installation instructions, inserts and warranty card 1600.

In another embodiment of the present disclosure and referring to FIG. 9 and FIG. 19, the gas control dial 105 may be used for controlling gas flow through a gas control valve, the gas control dial comprising a first segment notch, a plurality of level indicating segment notches and a blank or bypass segment notch wherein the first segment notch, the plurality of level indicating segment notches and the blank or bypass segment notch are spaced along a circumference of the gas control dial 105. The first segment notch includes a first segment wall, forming three sides of the first segment notch, having an open side opposite the first segment wall and a first segment floor, the first segment floor having a first segment identifying mark on the first segment floor, the first segment identifying mark being the word OFF, wherein the first segment identifying mark is rotationally enabled to align with a timer indicator mark on the gas control valve. Each of the plurality of level indicating segment notches include a second segment wall, the second segment wall forming three sides of the second segment notch, the second segment notch having an open side opposite the second segment wall, the second segment notch having a second segment floor, the second segment floor having a second segment identifying mark on the second segment floor, wherein the second segment identifying mark is rotationally enabled to align with a timer indicator mark to indicate consecutive levels of gas allowed through the gas control valve. The blank segment notch includes a blank segment wall, forming three sides of the blank segment notch, having an open side opposite the blank segment wall and a blank segment floor, the blank segment floor having a blank segment identifying mark on the blank segment floor, the blank segment having no identifying mark and is rotationally enabled to align with a timer indicator mark on the gas control valve. Segment floor 310 and segment wall 325 thereby forms the segment notch 300. The segment wall 325 is further comprised of the forward wall 315 having a forward wall face, the trailing wall 320 having a trailing wall face and the back wall 305 having a back wall face thereby surrounding the segment floor 310 on three sides by a raised segment wall 325. This forms a relief which surrounds the segment notch 300 on three sides. Using the segment notch 10 as a reference, the forward wall 315 of the segment notch 300 is proximal to the indicator 135 located on the housing body. The first segment wall may include a forward wall having a vertical face and the vertical face is sloped from 90 to 30 degrees with respect to the segment floor, a trailing wall having a sloping face the sloping face of the trailing wall is sloped from 25 degrees to 45 degrees with respect to the segment floor and a back wall having a sloping face the sloping face of the back wall is sloped from 10 degrees to 45 degrees with respect to the segment floor. In referring to FIG. 9, in general, for each of the first segment notch, the plurality of indicating segment notches and the blank segment notches, the segment floor 310 and segment wall form 325 the segment notch 300. The segment wall 325 is further comprised of the forward wall 315 having a forward wall face, the trailing wall 320 having a trailing wall face and the back wall 305 having a back wall face thereby surrounding the segment floor on three sides by a raised segment wall.

Figure 23:
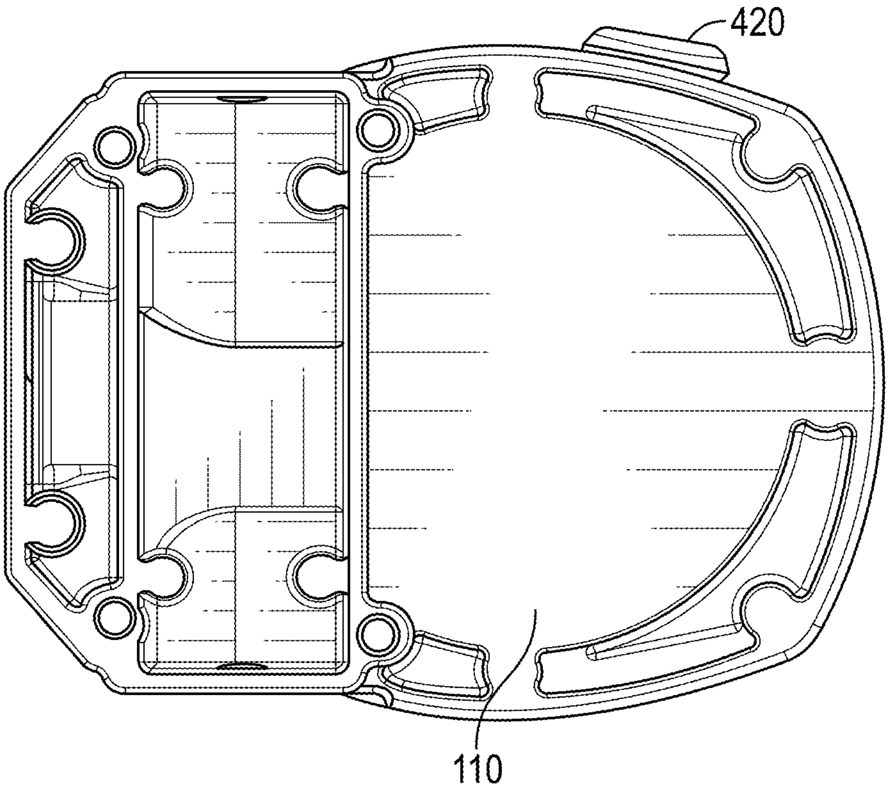
FIG. 23 is a line drawing of the bottom side view of the instant disclosure without the output fitting or the output hose.

Referring to FIG. 23, a bottom view of the timer device 110 is shown in accordance with one or more embodiments of the present disclosure. Shown is a layout of various fastening locations and footprint of the timing device 110. It is contemplated that various locations and/or combinations of fastener locations and footprints of the timing device 110 may be used without deviating form the heart of the disclosure.

Another aspect of the present disclosure is directed to a kit for controlling a gas grill. The kit includes a valve body having a timer indicator mark, a timer 210 {FIG. 2} attached to the valve body and a gas control dial 105 attached to the timer. The kit includes a gas supply connecting flared output fitting, an output hose, a hose connector; and at least one wrench, preferably two wrenches.

Another aspect of the present disclosure is directed to gas control module for a controlling the flow of gas to a gas burner, the gas control module comprising a valve body having a timer indicator mark 135, a gas valve disposed in the valve body, the gas valve for controlling gas passing therethrough, a timer 110 attached to the valve body and in communication with the gas valve. The timer controls the gas valve and as operated with a gas control dial. The gas control valve includes a first segment notch, a plurality of level indicating segment notches and a blank segment notch wherein the first segment notch, the plurality of level indicating segment notches and the blank segment notch are spaced along a circumference of the gas control dial. The first segment notch includes a first segment wall, forming three sides of the first segment notch, having an open side opposite the first segment wall and a first segment floor, the first segment floor having a first segment identifying mark on the first segment floor, the first segment identifying mark being the word OFF, wherein the first segment identifying mark is rotationally enabled to align with a timer indicator mark on the gas control valve. Each of the plurality of level indicating segment notches include a second segment wall, the second segment wall forming three sides of the second segment notch, the second segment notch having an open side opposite the second segment wall, the second segment notch having a second segment floor, the second segment floor having a second segment identifying mark on the second segment floor, wherein the second segment identifying mark is rotationally enabled to align with a timer indicator mark 135 to indicate consecutive levels of gas allowed through the gas control valve. The blank segment notch includes a blank segment wall, forming three sides of the blank segment notch, having an open side opposite the blank segment wall and a blank segment floor, the blank segment floor having no identifying mark and is rotationally enabled to align with a timer indicator mark on the gas control valve. In referring to FIG. 9, in general, for each of the first segment notch, the plurality of indicating segment notches and the blank segment notches, the segment floor 310 and segment wall form 325 the segment notch 300. The segment wall 325 is further comprised of the forward wall 315 having a forward wall face, the trailing wall 320 having a trailing wall face and the back wall 305 having a back wall face thereby surrounding the segment floor on three sides by a raised segment wall. This forms a relief which surrounds the segment notch on three sides. Using the segment notch 10 as a reference, the forward wall of the segment notch is proximal to the indicator 135 located on the housing body. The first segment wall may include a forward wall having a vertical face and the vertical face is sloped from 90 to 30 degrees with respect to the segment floor, a trailing wall having a sloping face the sloping face of the trailing wall is sloped from 25 degrees to 45 degrees with respect to the segment floor and a back wall having a sloping face the sloping face of the back wall is sloped from 10 degrees to 45 degrees with respect to the segment floor. The gas control dial allows a user to feel each of the dial first segment notch, the plurality of level indicating segment notches and the blank segment notch in order to set time increment in the timer without having to look at the dial.

Since many modifications, variations, and changes in detail can be made to the described embodiments of the disclosure, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the disclosure should be determined by the appended claims and their legal equivalents.

In addition, the present disclosure has been described with reference to embodiments, it should be noted and understood that various modifications and variations can be crafted by those skilled in the art without departing from the scope and spirit of the disclosure. Accordingly, the foregoing disclosure should be interpreted as illustrative only and is not to be interpreted in a limiting sense. Further it is intended that any other embodiments of the present disclosure that result from any changes in application or method of use or operation, method of manufacture, shape, size, or materials which are not specified within the detailed written description or illustrations contained herein are considered within the scope of the present disclosure.

Insofar as the description above and the accompanying drawings disclose any additional subject matter that is not within the scope of the claims below, the disclosures are not dedicated to the public and the right to file one or more applications to claim such additional disclosures is reserved.

Although very narrow claims are presented herein, it should be recognized that the scope of this disclosure is much broader than presented by the claim. It is intended that broader claims will be submitted in an application that claims the benefit of priority from this application.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A gas control dial for a gas control valve, the gas control dial comprising:

a first segment notch, a plurality of level indicating segment notches and a bypass segment notch wherein the first segment notch, the plurality of level indicating segment notches and the bypass segment notch are spaced along a circumference of said gas control dial;

said first segment notch including a first segment wall, forming three sides of said first segment notch, said first segment notch having an open side opposite said first segment wall and a first segment floor, said first segment floor having a first segment identifying mark on said first segment floor, said first segment identifying mark being the word OFF, wherein said first segment identifying mark is rotationally enabled to align with a timer indicator mark on said gas control valve;

each of said plurality of level indicating segment notches including a second segment wall, said second segment wall forming three sides of a second segment notch, said second segment notch having an open side opposite said second segment wall, said second segment notch having a second segment floor, said second segment floor having a second segment identifying mark on said second segment floor, wherein said second segment identifying mark is rotationally enabled to align with the timer indicator mark to indicate consecutive levels of gas allowed through said gas control valve; and said bypass segment notch includes a bypass segment wall, forming three sides of said bypass segment notch, having an open side opposite said bypass segment wall and a bypass segment floor, said bypass segment floor having BYPASS as a bypass identifying mark, and is rotationally enabled to align with the timer indicator mark on said gas control valve to indicate an unrestricted level of gas allowed through said gas control valve.

2. The gas control dial of claim 1 wherein the plurality of level indicating segment notches comprises:

a second segment notch having 10 as the second segment identifying mark;

a third segment notch having 20 as a third segment identifying mark;

a fourth segment notch having 30 as a fourth segment identifying mark;

a fifth segment notch having 40 as a fifth segment identifying mark;

a sixth segment notch having 50 as a sixth segment identifying mark; and a seventh segment notch having 60 as a seventh segment identifying mark.

3. The gas control dial of claim 1 wherein said first segment wall comprises a forward wall having a vertical face and said vertical face is sloped from 90 to 30 degrees with respect to said segment floor, a trailing wall having a sloping face said sloping face of said trailing wall is sloped from 25 degrees to 45 degrees with respect to said segment floor and a back wall having a sloping face said sloping face of said back wall is sloped from 10 degrees to 45 degrees with respect to said segment floor.

4. A kit for controlling a gas grill using the gas control dial according to claim 1, said kit comprising:

a. a valve body having a timer indicator mark;

b. a timer attached to said valve body;

c. the gas control dial attachable to said timer;

e. a gas supply connecting flared output fitting;

f. an output hose;

g. a hose connector; and h. at least one wrench.

5. The kit of claim 4 wherein said at least one wrench is a set of two wrenches.

6. The gas control dial of claim 1, further comprising a bypass button, wherein said bypass segment notch is prevented from being rotationally enabled to align with the timer indicator mark on said gas control valve unless the bypass button is depressed.

7. A gas control module for a controlling the flow of gas to a gas burner, the gas control module comprising:

a valve body having a timer indicator mark;

a gas valve disposed in the valve body, the gas valve for controlling gas passing therethrough;

a timer attached to the valve body and in communication with the gas valve, the timer for controlling the gas valve; and a gas control dial comprising:

a first segment notch, a plurality of level indicating segment notches and a bypass segment notch wherein the first segment notch, the plurality of level indicating segment notches and the bypass segment notch are spaced along a circumference of said gas control dial;

said first segment notch including a first segment wall, forming three sides of said first segment notch, having an open side opposite said first segment wall and a first segment floor, said first segment floor having a first segment identifying mark on said first segment floor, said first segment identifying mark being the word OFF, wherein said first segment identifying mark is rotationally enabled to align with the timer indicator mark on said gas control valve;

each of said plurality of level indicating segment notches including a second segment wall, said second segment wall forming three sides of a second segment notch, said second segment notch having an open side opposite said second segment wall, said second segment notch having a second segment floor, said second segment floor having a second segment identifying mark on said second segment floor, wherein said second segment identifying mark is rotationally enabled to align with the timer indicator mark to indicate consecutive levels of gas allowed through said gas control valve; and said bypass segment notch includes a bypass segment wall, forming three sides of said bypass segment notch, having an open side opposite said bypass segment wall and a bypass segment floor, said bypass segment floor having a bypass segment identifying mark on said bypass segment floor, said bypass segment having BYPASS as the bypass segment identifying mark and is rotationally enabled to align with the timer indicator mark on said gas control valve to indicate an unrestricted level of gas allowed through said gas control valve, wherein a user sets the time increment by rotating either the first segment notch, the plurality of level indicating segment notches or the bypass segment notch.

8. A tactile dial for a control valve comprising:

a first segment notch, a second segment notch, a third segment notch, a fourth segment notch, a fifth segment notch, a sixth segment notch, a seventh segment notch and an eighth segment notch wherein said first segment notch, said second segment notch, said third segment notch, said fourth segment notch, said fifth segment notch, said sixth segment notch, said seventh segment notch and said eighth segment notch are spaced along a circumference of said tactile dial;

said first segment notch having a first segment wall and said first segment wall forming three sides of said first segment notch and said first segment notch having an open side opposite said first segment wall and said first segment notch having a first segment floor and said first segment floor having a first segment identifying mark on said first segment floor and said first segment identifying mark is the word OFF and said first segment identifying mark is rotationally enabled to align with a timer indicator mark on said control valve;

said second segment notch having a second segment wall and said second segment wall forming three sides of said second segment notch and said second segment notch having an open side opposite said second segment wall and said second segment notch having a second segment floor and said second segment floor having a second segment identifying mark on said second segment floor and said second segment identifying mark is the number 10 and said second segment identifying mark is rotationally enabled to align with said timer indicator mark on said control valve;

said third segment notch having a third segment wall and said third segment wall forming three sides of said third segment notch and said third segment notch having an open side opposite said third segment wall and said third segment notch having a third segment floor and said third segment floor having a third segment identifying mark on said third segment floor and said third segment identifying mark is the number 20 and said third segment identifying mark is rotationally enabled to align with said timer indicator mark on said control valve;

said fourth segment notch having a fourth segment wall and said fourth segment wall forming three sides of said fourth segment notch and said fourth segment notch having an open side opposite said fourth segment wall and said fourth segment notch having a fourth segment floor and said fourth segment floor having a fourth segment identifying mark on said fourth segment floor and said fourth segment identifying mark is the number 30 and said fourth segment identifying mark is rotationally enabled to align with said timer indicator mark on said control valve;

said fifth segment notch having a fifth segment wall and said fifth segment wall forming three sides of said fifth segment notch and said fifth segment notch having an open side opposite said fifth segment wall and said fifth segment notch having a fifth segment floor and said fifth segment floor having a fifth segment identifying mark on said fifth segment floor and said fifth segment identifying mark is the number 40 and said fifth segment identifying mark is rotationally enabled to align with said timer indicator mark on said control valve;

said sixth segment notch having a sixth segment wall and said sixth segment wall forming three sides of said sixth segment notch and said sixth segment notch having an open side opposite said sixth segment wall and said sixth segment notch having a sixth segment floor and said sixth segment floor having a sixth segment identifying mark on said sixth segment floor and said sixth segment identifying mark is the number 50 and said sixth segment identifying mark is rotationally enabled to align with said timer indicator mark on said control valve;

said seventh segment notch having a seventh segment wall and said seventh segment wall forming three sides of said seventh segment notch and said seventh segment notch having an open side opposite said seventh segment wall and said seventh segment notch having a seventh segment floor and said seventh segment floor having a seventh segment identifying mark on said seventh segment floor and said seventh segment identifying mark is the number 60 and said seventh segment identifying mark is rotationally enabled to align with said timer indicator mark on said control valve; and said eighth segment notch having an eighth segment wall and said eighth segment wall forming three sides of said eighth segment notch and said eighth segment notch having an open side opposite said eighth segment wall and said eighth segment notch having an eighth segment floor and said eighth segment floor having an eighth segment identifying mark on said eighth segment floor and said eighth segment identifying mark is the word BYPASS and said eighth segment identifying mark is rotationally enabled to align with said timer indicator mark on said control valve, wherein a user sets the time increment by rotating either the first segment notch, second segment notch, third segment notch, fourth segment notch, fifth segment notch, sixth segment notch, seventh segment notch or the eighth segment notch.

9. The tactile dial of claim 8 wherein said first segment wall comprises a forward wall having a vertical face and said vertical face is sloped from 90 to 30 degrees with respect to said segment floor, a trailing wall having a sloping face said sloping face of said trailing wall is sloped from 25 degrees to 45 degrees with respect to said segment floor and a back wall having a sloping face said sloping face of said back wall is sloped from 10 degrees to 45 degrees with respect to said segment floor.

10. A kit for controlling a gas grill using the tactile dial according to claim 8, said kit comprising:

a valve body having a timer indicator mark;

a timer attached to said valve body;

the tactile dial attachable to said timer;

said tactile dial comprising at least one segment notch and said at least one segment notch is formed from a segment floor and said segment floor having a segment floor marking on it, and a segment wall, said at least one segment notch having an open side opposite said segment wall and said segment wall forming three sides of said at least one segment notch and said segment wall forming three sides such that said at least one segment notch and is said at least one segment notch rotatably alignable such that a user can align said at least one segment by aligning said segment floor marking with said timer indicator mark;

a gas supply connecting flared output fitting;

an output hose;

a hose connector; and at least one wrench.

11. The kit of claim 10, wherein said at least one wrench, is a set of two wrenches.

* * * * *